United States Patent
Bowser et al.

(10) Patent No.: US 8,392,297 B2
(45) Date of Patent: Mar. 5, 2013

(54) AUTOMOTIVE CORE FULFILLMENT SYSTEM AND METHOD

(75) Inventors: Jack A Bowser, Wakefield, RI (US); Christopher William Sneed, Worcester, MA (US); Brian Richard Maday, Warwick, RI (US)

(73) Assignee: Rebuilders Automotive Supply, Coventry, RI (US)

( * ) Notice: Subject to any disclaimer, the term of this patent is extended or adjusted under 35 U.S.C. 154(b) by 407 days.

(21) Appl. No.: 12/839,145

(22) Filed: Jul. 19, 2010

(65) Prior Publication Data

US 2011/0010276 A1 Jan. 13, 2011

Related U.S. Application Data

(63) Continuation-in-part of application No. 12/691,956, filed on Jan. 22, 2010, now abandoned, which is a continuation of application No. 12/017,767, filed on Jan. 22, 2008, now Pat. No. 7,680,706.

(60) Provisional application No. 60/881,524, filed on Jan. 22, 2007.

(51) Int. Cl.
  *G06Q 10/00* (2012.01)
  *G06F 17/50* (2006.01)
  *A01K 5/02* (2006.01)
(52) U.S. Cl. ............................................ 705/28; 705/29
(58) Field of Classification Search .................... 705/28, 705/29
See application file for complete search history.

(56) References Cited

U.S. PATENT DOCUMENTS 4,037,302 A * 7/1977 Hollander .................... 29/403.3
4,905,363 A   3/1990 Boyenval
(Continued)

FOREIGN PATENT DOCUMENTS

DE   10214834   10/2003
JP   2000053045   2/2000
(Continued)

OTHER PUBLICATIONS

Auto recyclers Embrace ADP Hollanders powerlink, Business wire, May 7, 2002.*

(Continued)

*Primary Examiner* — Garcia Ade
*Assistant Examiner* — Harshad Parikh
(74) *Attorney, Agent, or Firm* — J.A. Lindeman & Co., PLLC

(57) ABSTRACT

A system and method for facilitating acquisition of automotive core parts from automotive recyclers for remanufacture includes identifying automotive cores and determining the value of the cores with a core fulfillment system. The system identifies automotive cores for an auction house and uses an aggregate value of the cores to determine a value of a vehicle up for bidding. Vehicle or part type information is compared to automotive core descriptions, automotive interchange numbers, and core supplier indicators to identify the automotive cores. A core value is assigned to the identified automotive cores, and an aggregate value of core inventory is determined based upon a total of assigned core values. A vehicle evaluation page can be displayed to the bidder showing the identified automotive cores and an aggregate core value indicating an offer for purchase price that a core supplier will pay to the bidder for the vehicle up for bidding.

30 Claims, 24 Drawing Sheets

U.S. PATENT DOCUMENTS

| | | | |
|---|---|---|---|
| 5,504,674 A * | 4/1996 | Chen et al. | 705/4 |
| 5,868,328 A * | 2/1999 | Luoma | 241/101.2 |
| 5,965,858 A | 10/1999 | Suzuki et al. | |
| 6,633,795 B1 | 10/2003 | Suzuki et al. | |
| 6,732,417 B2 | 5/2004 | Kaburagi et al. | |
| 7,013,101 B2 * | 3/2006 | Maruyama et al. | 399/109 |
| 7,054,824 B1 * | 5/2006 | Grenchus et al. | 705/7.12 |
| 7,251,611 B2 * | 7/2007 | Abbott et al. | 705/7.12 |
| 7,596,512 B1 * | 9/2009 | Raines et al. | 705/26.61 |
| 7,680,706 B2 * | 3/2010 | Bowser et al. | 705/28 |
| 7,694,921 B1 * | 4/2010 | Williams | 248/127 |
| 8,171,283 B2 * | 5/2012 | Pietrowicz et al. | 713/156 |
| 2002/0007289 A1 * | 1/2002 | Malin et al. | 705/4 |
| 2002/0069137 A1 | 6/2002 | Hiroshige et al. | |
| 2002/0123918 A1 * | 9/2002 | Brown et al. | 705/7 |
| 2002/0161906 A1 * | 10/2002 | Teraura | 709/230 |
| 2003/0050843 A1 * | 3/2003 | Onoue | 705/20 |
| 2003/0193155 A1 * | 10/2003 | Smith | 280/124.1 |
| 2003/0201633 A1 * | 10/2003 | Bernard | 280/762 |
| 2004/0167833 A1 * | 8/2004 | Schickler | 705/28 |
| 2005/0049944 A1 * | 3/2005 | Chernoff et al. | 705/28 |
| 2005/0125261 A1 * | 6/2005 | Adegan | 705/4 |
| 2006/0195384 A1 * | 8/2006 | Bauer et al. | 705/37 |
| 2008/0046383 A1 * | 2/2008 | Hirtenstein et al. | 705/400 |
| 2008/0082427 A1 * | 4/2008 | Gandhi et al. | 705/28 |
| 2008/0183600 A1 * | 7/2008 | Bowser et al. | 705/28 |
| 2009/0057449 A1 * | 3/2009 | Forte et al. | 241/101.74 |
| 2009/0259563 A1 * | 10/2009 | Ruhnke et al. | 705/26 |
| 2010/0148937 A1 * | 6/2010 | Howard | 340/10.6 |
| 2010/0185497 A1 * | 7/2010 | Bowser et al. | 705/10 |
| 2011/0010276 A1 * | 1/2011 | Bowser et al. | 705/29 |
| 2011/0270635 A1 * | 11/2011 | Raines et al. | 705/4 |
| 2012/0095927 A1 * | 4/2012 | Hirtenstein et al. | 705/306 |

FOREIGN PATENT DOCUMENTS

| | | |
|---|---|---|
| JP | 2002334224 | 11/2002 |
| JP | 2004216250 | 8/2004 |
| JP | 2004240534 | 8/2004 |
| JP | 2004362260 | 12/2004 |

OTHER PUBLICATIONS

Brian K. Thorn et al., "Take it Back: Remanufacturing Is a Viable Alternative to Disposal of Products that have Outlived Their Usefulness-But Only if Engineers Can Unearth Sound Economic Justifications (Manufacturing Industry Recycling)", Apr. 2002, vol. 34, ISSN: 1085-1259.

Gale Group, "Auto Recyclers Embrace ADP Hollander's Newly Redesigned Powerlink; Next Generation of Business Management System Enhances Productivity with Intuitive New Workflow (Manufacturing Industry Recycling)", Business Wire, May 7, 2002, Michigan, USA.

Deanne Toto, "Mining for Dollars: In Addition to Their Standard Parts Revenue, Auto Dismantlers Mine Automobiles for Hidden Value in the Form of Recoverable Nonferrous Scrap Metal, Automotive Recycling Update". Sep. 1, 2003. Michigan, USA.

Max Kvidera., "End of the Line: Discarded Cars and the Lifeblood for Schnitzer Steel Industries Subsidiary Pick-n-Pull," (Scrap Metals Supplement). Recycling Today. Jan. 1, 2006, Michigan, USA.

Lynn Novell, "Rebuilders Automotive Supply (RAS) has had a Single Focus for More Than 35 years: Purchase High-Quality Automotive Cores from Recyclers for Volume Sales to the Remanufacturing Aftermarket Industry," At a Glance. Apr. 2006.

* cited by examiner 242    240

244

246

| | | | |
|---|---|---|---|
| ☐ Caliper | Left Front, 4 cyl - cast# 5703 FRONT LSIDE | $0.00 | |
| ☐ Caliper | Left Front, 4 cyl - cast#5719 FRONT LSIDE | $0.00 | |
| ☐ Caliper | Left Front, 6 cyl - cast# 17CL15VN FRONT LSIDE | $0.00 | |
| ☐ Caliper | Left Front, 6 cyl - cast#17CL15VN FRONT LSIDE | $0.00 | ← 256 |
| ☑ Caliper | Left Rear, 4 cyl - CAST# 9CLP14S REAR LSIDE | $20.00 | ← 97a |
| ☑ Caliper | Left Rear, 4 cyl - CAST# 3403 REAR LSIDE | $20.00 | ← 97b |
| ☐ Caliper | Left Rear, 6 cyl - CAST# 9CLP14S REAR LSIDE | $20.00 | |
| ☐ Caliper | Left Rear, 6 cyl - CAST# 3403 REAR LSIDE | $20.00 | |
| ☐ Caliper | Right Front, 4 cyl - cast# 5703 FRONT RSIDE | $0.00 | |
| ☐ Caliper | Right Front, 4 cyl - cast#5719 FRONT RSIDE | $0.00 | |
| ☐ Caliper | Right Front, 6 cyl - cast# 17CL15VN FRONT RSIDE | $0.00 | |
| ☐ Caliper | Right Front, 6 cyl - cast#17CL15VN FRONT RSIDE | $0.00 | |
| ☑ Caliper | Right Rear, 4 cyl - CAST# 9CLP14S REAR RSIDE | $20.00 | ← 97c |
| ☑ Caliper | Right Rear, 4 cyl - CAST# 3403 REAR RSIDE | $20.00 | ← 97d |
| ☐ Caliper | Right Rear, 6 cyl - CAST# 9CLP14S REAR RSIDE | $20.00 | |
| ☐ Caliper | Right Rear, 6 cyl - CAST# 3403 REAR RSIDE | $20.00 | |
| ☑ Distributor | 4 cyl, Hitachi (LX & EX) - OE# 30100-PCA-003,30100PAAA01,30100PAAA02 | $10.00 | ← 97e |
| ☐ Distributor | 4 cyl, Hitachi (LX & EX) - D4T96-07 | $5.00 | |
| ☐ Distributor | 4 cyl, Tec (DX) - OE# 30100-PABA01 | $35.00 | |
| ☐ Distributor | 4 cyl, Tec (DX) - TD-91U - W/O COIL | $5.00 | |
| ☐ Distributor | 6 cyl | $0.00 | |
| ☐ Power Window Motor | Right Front, Cpe (2 Dr) | $8.00 | |
| ☐ Power Window Motor | Right Rear | $8.00 | |
| ☑ Starter Motor | 4 cyl, AT | $15.00 | ← 97f |
| ☐ Starter Motor | 4 cyl, MT | $2.00 | |
| ☐ Starter Motor | 6 cyl | $15.00 | |
| ☐ Steering Gear/Rack | Power Rack & Pinion, Cpe (2 Dr) | $0.00 | |
| ☑ Steering Gear/Rack | Power Rack & Pinion, Sdn (4 Dr), 4 cyl | $30.00 | ← 97g |
| ☐ Steering Gear/Rack | Power Rack & Pinion, Sdn (4 Dr), 6 cyl | $0.00 | |
| ☐ Water Pump | 2.3L (4 cyl) | $0.00 | |
| ☐ Water Pump | 3.0L (6 cyl) | $0.00 | |
| ☐ Wiper Motor, Windshield | | $0.00 | |

Check All   Uncheck All

Stock #    *VIN #    Dismantler    Notes
272 → [testaccord]  [      ]   [cws]   [check oem numbers] ← 278

[Save Batch] ← 280

NOTE: Do not click the submit button more than once or re-fresh the page during processing. This will result in the creation of duplicate batches.

*VIN number must be 17 digits and is required for 2007 and later vehicles.

Invoice

RAS
1650 FLAT RIVER RD COVENTRY, RI 02816
Ph: 800-633-0162
Fx:

RASCorePro
1650 Flat River Road
Coventry, RI 02816
Ph: 1 800-633-0162
　　 401-822-3030
Fx: 401-828-8488

Date: 01/18/08　　Invoice: RAS-001174　　Total: $135.00

Invoice

| Batch: RAS-testaccord | 1998 Honda ACCORD | | $135.00 |
|---|---|---|---|
| 000000152092 | Right Rear, 4 cyl -　CAST# 3403 REAR RSIDE | Caliper | $20.00 |
| 000000152091 | Right Rear, 4 cyl -　CAST# 9CLP14S REAR RSIDE | Caliper | $20.00 |
| 000000152090 | Left Rear, 4 cyl -　CAST# 3403 REAR LSIDE | Caliper | $20.00 |
| 000000152089 | Left Rear, 4 cyl -　CAST# 9CLP14S REAR LSIDE | Caliper | $20.00 |
| 000000152093 | 4 cyl, Hitachi (LX & EX) -　OE# 30100-PCA-003,30100PAAA01,30100PAAA02 | Distributor | $10.00 |
| 000000152094 | 4 cyl, AT | Starter Motor | $15.00 |
| 000000152095 | Power Rack & Pinion, Sdn (4 Dr), 4 cyl | Steering Gear/Rack | $30.00 |

The vehicle part search questions and vehicle part description text appearing on this web site are
copyright © 2007 by Audatex North America, Inc. All rights reserved.

Packing Slip

RAS
1650 FLAT RIVER RD COVENTRY, RI 02816
Ph: 800-633-0162
Fx:

RASCorePro
1650 Flat River Road
Coventry, RI 02816
Ph: 1 800-633-0162
    401-822-3030
Fx: 401-828-8488

Date: 01/18/08    Invoice: RAS-001174

Packing Slip

| Batch: RAS-testaccord | | 1998 Honda ACCORD | |
|---|---|---|---|
| 000000152092 | Right Rear, 4 cyl - | CAST# 3403 REAR RSIDE | Caliper |
| 000000152091 | Right Rear, 4 cyl - | CAST# 9CLP14S REAR RSIDE | Caliper |
| 000000152090 | Left Rear, 4 cyl - | CAST# 3403 REAR LSIDE | Caliper |
| 000000152089 | Left Rear, 4 cyl - | CAST# 9CLP14S REAR LSIDE | Caliper |
| 000000152093 | 4 cyl, Hitachi (LX & EX) - | OE# 30100-PCA-003,30100PAAA01,30100PAAA02 | Distributor |
| 000000152094 | 4 cyl, AT | | Starter Motor |
| 000000152095 | Power Rack & Pinion, Sdn (4 Dr), 4 cyl | | Steering Gear/Rack |

The vehicle part search questions and vehicle part description text appearing on this web site are
copyright © 2007 by Audatex North America, Inc. All rights reserved

AUTOMOTIVE CORE FULFILLMENT SYSTEM AND METHOD

CROSS-REFERENCE TO RELATED APPLICATIONS

The present application is a continuation-in-part application of U.S. patent application Ser. No. 12/691,956 filed on Jan. 22, 2010, which is a continuation application of U.S. patent application Ser. No. 12/017,767 filed on Jan. 22, 2008, entitled "Automotive Core Fulfillment System and Method," now U.S. Pat. No. 7,680,706, which claims the benefit of priority of U.S. Provisional Patent Application No. 60/881,524 filed on Jan. 22, 2007. These applications and their disclosures are incorporated by reference below in their entirety.

FIELD OF THE INVENTION

The present invention is directed to system and method for facilitating acquisition of automotive cores from the automotive recycling industry for remanufacture.

BACKGROUND OF THE INVENTION

Automotive recyclers such as salvage yards acquire used automotive parts, such as powertrain, chassis, and body parts of automobiles. Many of the mechanical parts from these vehicles are referred to in the salvage industry as "cores." Cores are typically extracted from automobiles that were purchased by the recyclers for the purpose of disassembling them to sell the cores. In other instances, cores may be acquired from manufacturers of the parts themselves, where a defect has been found in the manufactured part so that the part cannot be used unless remanufactured.

The automotive recyclers sell the extracted cores from automobiles to core suppliers that gather large quantities of a particular core for a particular vehicle. Core suppliers identify the purchased cores and then verify that the cores can be remanufactured or otherwise reconditioned. These gathered quantities of cores for a particular vehicle are then sold to remanufacturers who recondition these parts. For remanufacturers, receiving good, rebuildable cores in large quantities is important since remanufacturing of the cores often requires tooling and machining lines that must be set up for a particular core. Thus, remanufacturers typically prefer to purchase cores from core suppliers in bulk rather than from automotive recyclers one piece at a time.

The remanufacturers recondition or remanufacture these cores and then sell these remanufactured/reconditioned parts to wholesale or retail automotive part suppliers. Because these cores are reconditioned rather than being entirely manufactured, the remanufactured parts can be sold for less than the corresponding new parts.

Automotive recyclers use a standard parts identification system referred to as an interchange, such as the Hollander interchange, for example, to help identify parts from vehicles. Such interchange systems allow an automotive recycler to identify the make, model, and year range of most parts on a given vehicle, and to identify the parts using a proprietary alphanumeric identification system. In contrast, core suppliers and remanufacturers may utilize different identification numbers than the automotive recyclers. For example, core suppliers and remanufacturers may use Original Equipment Manufacturer (OEM) numbers, casting numbers, and remanufacturer-specific proprietary stock keeping unit (SKU) numbers. These numbers are very specific and do not have the same year make model breakdown availability that salvage industry interchanges have. The core supplier numbers are very specific whereas the salvage industry interchange numbers are very broad and may encompass many different numbers.

Efforts to date to improve the ability to cross reference core supplier numbers to salvage industry interchange numbers have been largely unsuccessful in providing a cost-effective manner of identifying specific cores sought by core suppliers. Additionally, core suppliers have not been able to satisfactorily characterize salvage yard inventories. Efforts aimed at improving the ability of the parties to accurately identify and supply the required parts have been extremely labor-intense and have not provided a satisfactory return on the amount of resources expended. What is needed is a system and a method for quickly and accurately determining salvage yard inventories and determining the value of a particular part from a particular automobile.

SUMMARY OF THE INVENTION

The above-described difference in automotive part identification systems and methods used has been found to be a significant problem for the salvage industry and for the core supplier industry, where most of the acquired cores are purchased from salvage facilities of automotive recyclers. In particular, automotive recyclers are unaware of demand and pricing of the specific cores being sought after by the core suppliers. In the present application, the term "cores" refers to mechanical and electrical automobile parts, which are to be rebuilt, refurbished, or otherwise reconditioned. For the purposes of this application, the term "cores" and automobile parts that are to be rebuilt, refurbished, or otherwise reconditioned are synonymous.

In addition, automotive recyclers do not have an efficient way to easily determine the value of a particular part from a particular automobile. Correspondingly, valuable labor may be expended by the automotive recycler in removing a part from an automobile, only to find that the core supplier is not willing to purchase the part due to a lack of demand, a sufficient or overabundant existing supply inventory, and the like. In addition, valuable labor may be expended by the automotive recycler in removing a part from an automobile, only to find that the value of the part offered for purchase by the core supplier is not enough to cover even the labor cost incurred for the removal of the part.

Conversely, the automotive recycler may choose not to remove a particular first part from an automobile in view of the labor costs involved, and instead, the automotive recycler removes other certain parts of the automobile in a separate dismantling facility. The automotive recycler then stores the dismantled automobile in the salvage yard. The automotive recycler may later find that there was sufficient demand for the first part so that a profit could have been made by removing the particular in-demand first part from the automobile when it was in the dismantling facility, where tools for removal are immediately available. However, removal of such first part may no longer be profitable because the automobile has been stored in the salvage yard and is no longer at the dismantling facility.

In both of the above described situations, the result is that the automotive recycler receives reduced profits, either by incurring unnecessarily increased labor costs, or by foregoing potential sales. The automotive core fulfillment system and method in accordance with the present invention addresses these problems to increase the automotive recycler's profits, as well as to provide the automotive recycler with a guaranteed and predetermined sales outlet for their inventory.

An automotive core fulfillment system in accordance with the present invention includes an interchange database that includes automotive core descriptions with corresponding interchange identification indicators. The system also includes a core supplier database that includes automotive core descriptions with corresponding core supplier identification indicators. The core supplier identification indicators may include original equipment manufacturer (OEM) part numbers or other core supplier numbers. The system also includes an interchange number matching module that equates a database entry in the interchange database with a database entry in the core supplier database. The system of the present invention may utilize Hollander numbers as the interchange identification indicators, or the system may use other interchange identification indicators, such as Lester numbers, and the like. The interchange number matching module matches interchange identification indicators with corresponding core supplier identification indicators.

Additionally, the automotive core fulfillment system of the present invention may include an interface module that provides access to the automotive core fulfillment system and accepts vehicle information and provides demand and pricing information regarding automotive cores. Further, the system of the present invention may utilize an on-site interface, or may include an interface module that provides remote access to the automotive core fulfillment system with a terminal or other communication device through a computer network or other communications network.

A method of the present invention identifies an automotive core and determines the value of the automotive core with a core fulfillment system. The method includes receiving vehicle identification information, comparing the vehicle identification information to automotive core descriptions and automotive interchange numbers and core supplier identification indicators that correspond to the vehicle identification information. The method also includes identifying the automotive core based upon the comparison of the vehicle identification information to automotive core descriptions and automotive interchange numbers and core supplier identification indicators, the automotive core including a part type identifier, a yard description, and a core value. Of course, all parts of an automobile may be identified, including all mechanical and electrical parts of the automobile, and the value of the part may be determined using the system and method of the present invention. For brevity, this application refers to such mechanical parts and electrical parts as "automotive cores" or simply "cores."

Additionally, the method of identifying an automotive core and determining the value of the automotive core includes determining a demand for the automotive core. The vehicle identification information may include the year the vehicle was manufactured, the make of the vehicle, and the model of the vehicle. Additional identification information may also be used, including engine type, engine displacement, transmission type, brake type, number of doors, and the like, to expand or restrict the search based upon the more specific or less specific type of vehicle.

Multiple cores may be identified using a list of vehicle identifiers, and the value of those cores may be determined simultaneously. The list of vehicle identifiers may be a manual list, a bar code or bar codes, an electronic VIN number or VIN numbers, or any other notation of multiple vehicle identifiers. With this vehicle identifier information, a core inventory value may be determined based upon an aggregate total of core values of identified automotive cores.

An alternative method of identifying an automotive core and determining the value of the automotive core with a core fulfillment system in accordance with the present invention includes receiving part type identification information, receiving an automotive interchange number, and comparing the part type identification information to automotive core descriptions and core supplier identification indicators that correspond to the vehicle identification information and the automotive interchange numbers. The results of this comparison are then used to identify the automotive core based upon the comparison of the part type identification information and automotive interchange number to automotive core descriptions and core supplier identification indicators. The identified automotive core may include a part type identifier, a yard description, and a core value. Additionally, the automotive core entry may include demand information for the automotive core.

Also, another example method uses the core fulfillment system to identify automotive cores for an auction bidder and uses an aggregate value of the identified automotive cores to determine a value of a vehicle up for bidding. In this example, vehicle identification information is received from an auction house in the interface computing device. The vehicle identification information from the auction house in the interface computing device is compared to automotive core descriptions and automotive interchange numbers in an interchange database and core supplier identification indicators in a core supplier database that correspond to the vehicle identification information.

Likewise, part type identification information or automotive interchange numbers can be provided by the auction house and used as the basis for determining the automotive core(s) descriptions and core supplier identification indicators that correspond to vehicle identification information.

After receiving the vehicle identification information, part type identification information, and/or automotive interchange numbers, the automotive core(s) are identified using an interchange number matching computing device based upon the comparison of the vehicle identification information to automotive core descriptions and automotive interchange numbers and core supplier identification indicators, the automotive core including a part type identifier and an optional yard description. A core value is assigned to the identified automotive core, and an aggregate value of core inventory is determined based upon an aggregate total of assigned core values of identified automotive cores.

A vehicle evaluation page can then be displayed to the auction bidder. The vehicle evaluation page shows the identified automotive core(s) optional yard descriptions, and an aggregate core value. The aggregate core value indicates an offer for purchase price that a core supplier will pay to the auction bidder for the vehicle up for bidding based upon the demand for the automotive core(s).

DETAILED DESCRIPTION OF THE INVENTION

Figure 1:
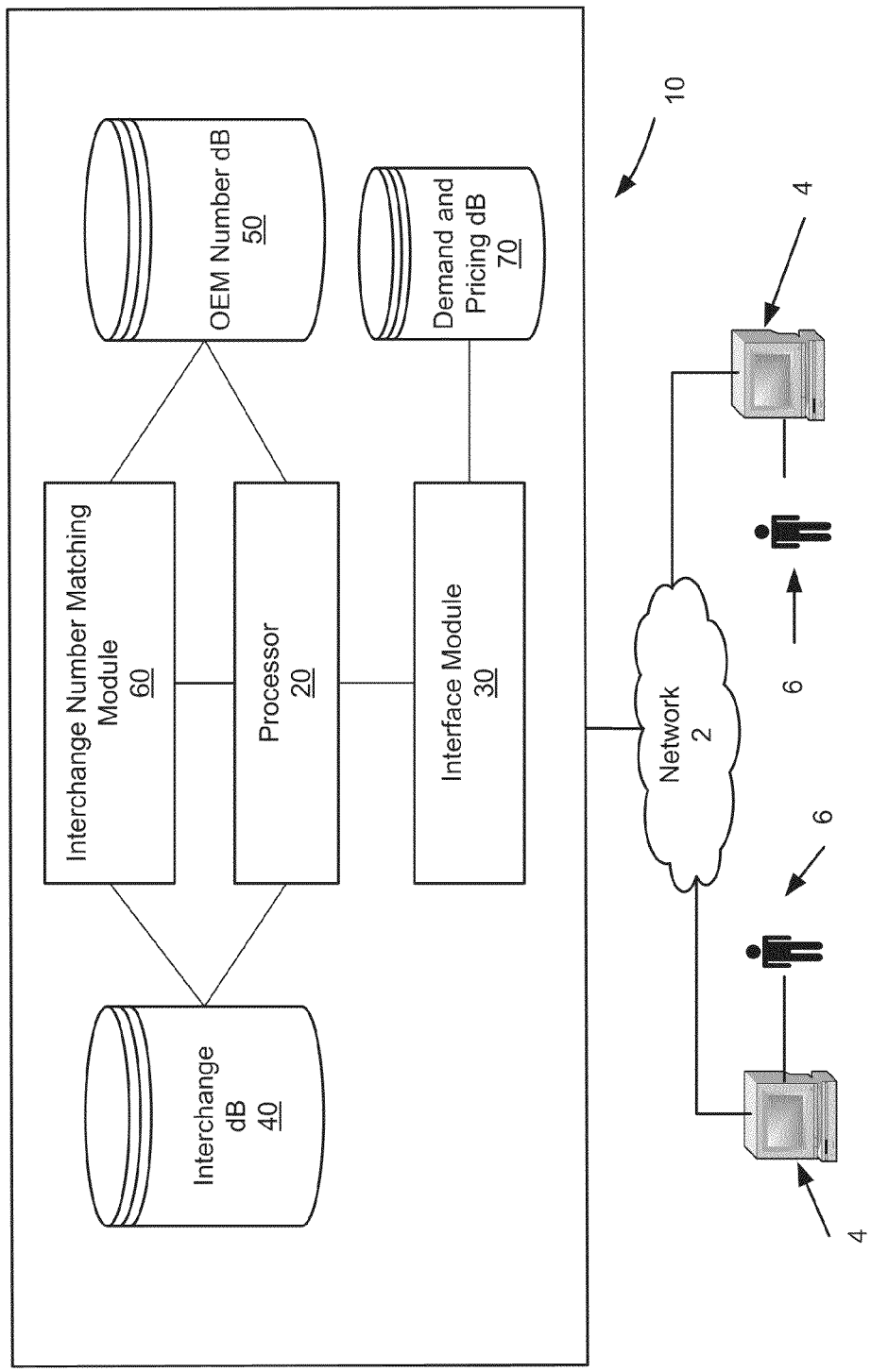
FIG. 1 is a schematic illustration of an automotive core fulfillment system in accordance with one embodiment of the present invention.

FIG. 1 is a schematic illustration of an automotive core fulfillment system 10 in accordance with one embodiment of the present invention. In accordance with the illustrated embodiment, the automotive core fulfillment system 10 is provided with a processor 20 that is adapted to control and facilitate functions of various modules and components of the automotive core fulfillment system 10 as described in detail below. It should be initially noted that the automotive core fulfillment system 10 of FIG. 1 may be implemented with any type of hardware and software, and may be a pre-programmed general purpose computing device. For example, the automotive core fulfillment system 10 may be implemented using a server, a personal computer, a portable computer, a thin terminal, a hand held device, a wireless device, or any combination of such devices. The automotive core fulfillment system 10 may be a single device at a single location or multiple devices at a single location, or multiple devices at multiple locations that are connected together using any appropriate communication protocols over any communication medium such as electric cable, fiber optic cable, any other cable, or in a wireless manner using radio frequency, infrared, or other technologies.

In the illustrated embodiment, the automotive core fulfillment system 10 is connected to a network 2 that allows remote access to the automotive core fulfillment system 10 so that vehicle information and interchange information can be entered, and so that demand and pricing information regarding automotive cores can be retrieved from the system. The network 2 allows the automotive core fulfillment system 10 to interact with remotely located terminals 4, which are utilized by automotive recyclers 6. The network 2 may be any type of communications channel, such as the Internet, a local area network (LAN), a wide area network (WAN), direct computer connections, and the like, and may be connected in a wireless manner using radio frequency, infrared, or other communication technologies, using any type of communication hardware and protocols. The terminals 4 may be implemented using a server, a personal computer, a portable computer, a thin terminal, a hand held device, a wireless device, and any other computing devices, or any combination of such devices.

It should also be noted that the automotive core fulfillment system 10 in accordance with one embodiment of the present invention is illustrated and discussed herein as having a plurality of modules and/or components that perform particular functions. It should be understood that these modules are merely schematically illustrated based on their function for clarity purposes only, and do not necessary represent specific hardware or software. In this regard, these modules and/or sub-modules may be implemented as hardware and/or software to substantially perform the particular functions explained. Moreover, two or more of these modules may be combined together within the automotive core fulfillment system 10, or divided into more modules based on the particular function desired. Thus, the present invention as schematically embodied in FIG. 1 should not be construed to limit the automotive core fulfillment system 10 of the present invention.

In the above regard, the automotive core fulfillment system 10 in accordance with the illustrated embodiment also includes an interface module 30 that allows the automotive recyclers 6 to easily enter a particular vehicle's information such as year, make and model, and retrieve demand and pricing information for the various automotive cores of the particular vehicle from the automotive core fulfillment system 10 via the terminals 4. Similarly, interface module 30 provides an input and output pathway from automotive recyclers 6 and core fulfillment system 10. In this regard, the interface module 30 includes a graphical user interface (GUI) for receiving vehicle information and other information input by automotive recyclers 6, and a GUI for displaying the demand and pricing information for the various automotive cores of the inputted vehicle.

Numerous databases are provided in the automotive core fulfillment system 10 in accordance with the illustrated embodiment. In particular, the automotive core fulfillment system 10 shown includes an internal interchange database 40, which includes automotive core descriptions and automotive recycler's interchange numbers for numerous vehicle makes, models, years, and the like. Other information regarding the automotive cores can be stored in the interchange database 40 as well such as corresponding core supplier's part numbers and/or other interchange numbers, as well as additional core information. The automotive core fulfillment system 10 shown also includes a core supplier database such as Original Equipment Manufacturer (OEM) number database 50, which includes automotive core descriptions and their corresponding OEM part numbers for numerous vehicle makes, models, and years, for example. Of course, other information regarding the automotive cores can be stored in OEM number database 50 as well.

In addition, the automotive core fulfillment system 10 in accordance with the illustrated embodiment of the present invention includes an interchange matching module 60 that allows matching of the recycler's interchange number stored in the interchange database 40 with a corresponding OEM number stored in the OEM number database 50. Thus, when the automotive recycler 6 enters various vehicle information or interchange information using the terminal 4, the automotive core fulfillment system 10 identifies the various automotive cores and their corresponding recycler's interchange numbers in the interchange database 40, and matches these interchange numbers with the corresponding OEM numbers stored in the OEM number database 50. In this regard, the data that is stored in the interchange database 40 and the OEM numbers database 50 is updated periodically to include new vehicle models and corresponding part numbers for the cores. Therefore, the automotive core fulfillment system 10 greatly facilitates accurate identification of automotive cores between the automotive recycler and the core supplier and remanufacturer so that any transactions regarding the cores between these parties can be facilitated.

Furthermore, the automotive core fulfillment system 10 in accordance with the illustrated embodiment also includes a Demand and Pricing database 70, which includes demand information for particular cores that indicates whether there is an existing remanufacturer requesting particular cores for purchase. In addition, the Demand and Pricing database 70 also includes pricing information that identifies the price at which the particular cores will be purchased by the core supplier and/or by the remanufacturer from the automotive recycler 6. It is important to note that the pricing information is an offer for purchase price, and not an offer for sale price. The demand and pricing information is largely provided by the demands of the remanufacturers for the particular parts. Correspondingly, because the remanufacturers utilize OEM part numbers, the demand information and pricing information stored in the Demand and Pricing database 70 is correlated to the OEM parts. This information stored in the Demand and Pricing database 70 is also updated periodically to include new demand and new pricing information as demand and prices change in the marketplace. With up-to-date demand and pricing information, automotive recyclers 6 and core suppliers can make informed decisions about transactions to which they are a party.

It should also be understood that the price for a particular core will typically differ between the core supplier and the (end-user) remanufacturer since the core supplier is in the business of aggregating large quantities of a particular core for the remanufacturers, and the core supplier will purchase the cores from a plurality of automotive recyclers, and then sell the aggregated quantity to the remanufacturers at a higher price to make some profit. Thus, in one application of the present invention in which the automotive core fulfillment system 10 is utilized by a core supplier, the Demand and Pricing database 70 includes the prices that the core supplier is willing to pay to the automotive recyclers for the cores. That is the core value quoted is an offer to purchase price. When the core supplier's offer to purchase price is accepted by an automotive recycler, the core supplier makes a profit after covering the costs of aggregation and inspection of the cores and other services that the core supplier may provide. Of course, in other applications, for example where the automotive core fulfillment system 10 is utilized by a remanufacturer, the Demand and Pricing database 70 includes the prices that the remanufacturer is willing to pay directly to the automotive recyclers for the cores, or similarly, a price that the remanufacturer is willing to pay to a plurality of core suppliers.

The automotive core fulfillment system 10 in accordance with the present invention provides an output to the automotive recycler 6 that includes the "salvage value" for a particular vehicle input into the system 10. The output identifies those cores of the particular vehicle for which there is a demand, and an offer to purchase price can be identified to purchase the identified parts from the automotive recycler.

Figure 2A:
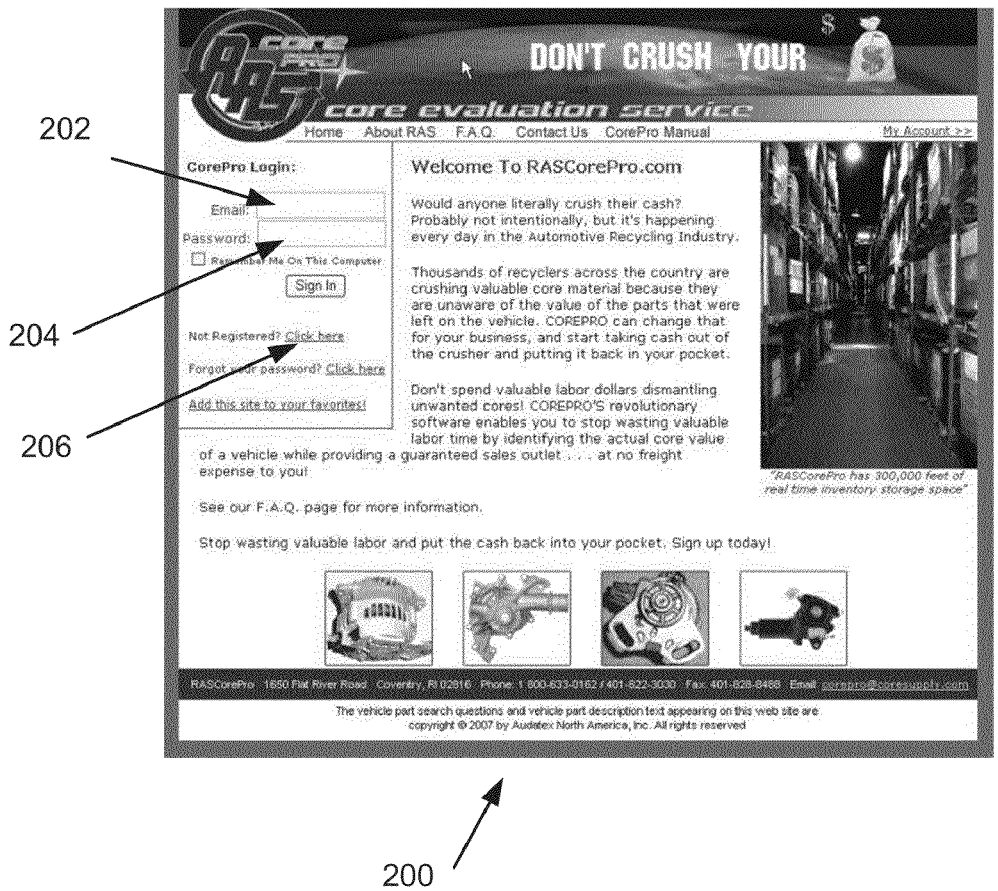
FIGS. 2A-2W shows example user interface screens generated by the automotive core fulfillment system of FIG. 1 as an automotive recycler accesses core fulfillment information in accordance with one embodiment of the present invention.
Figure 2B:
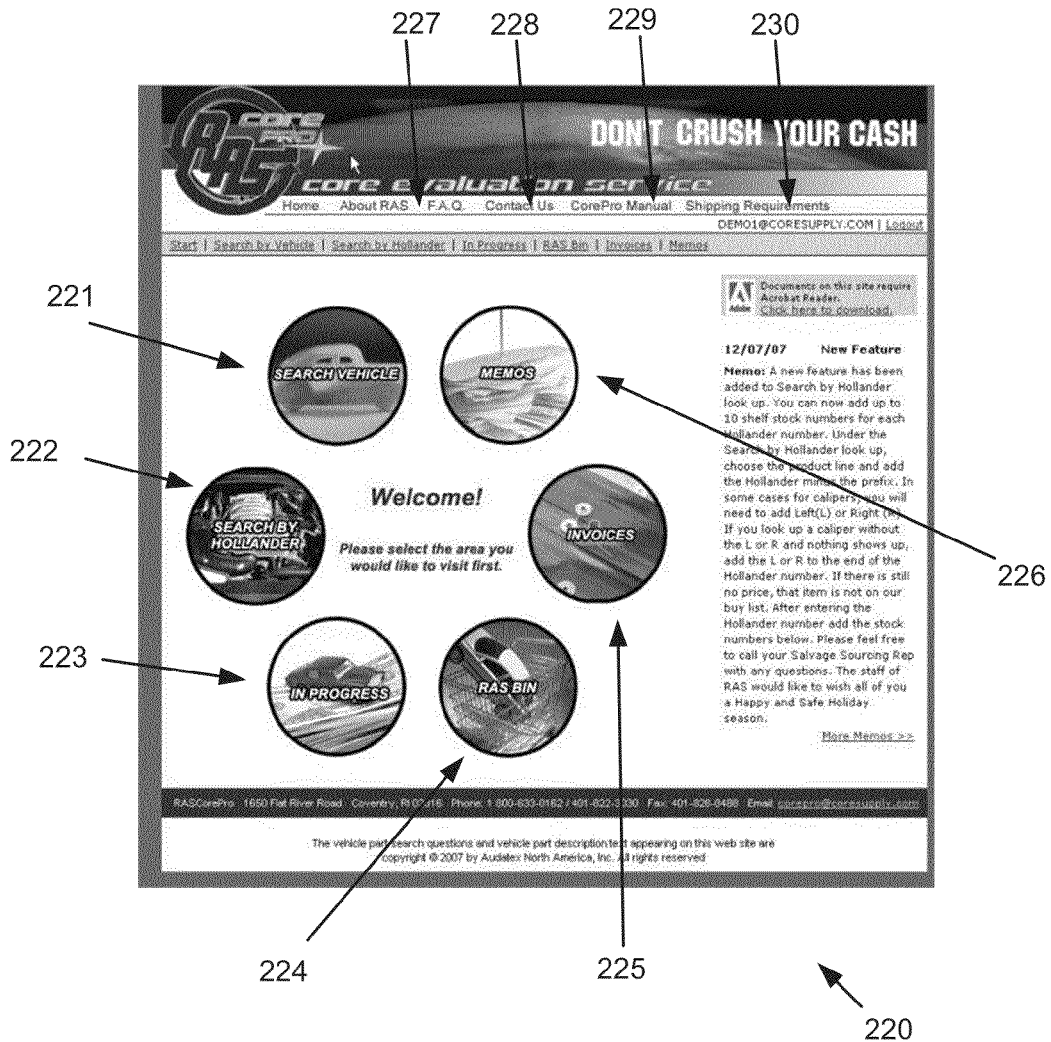
Figure 2C:
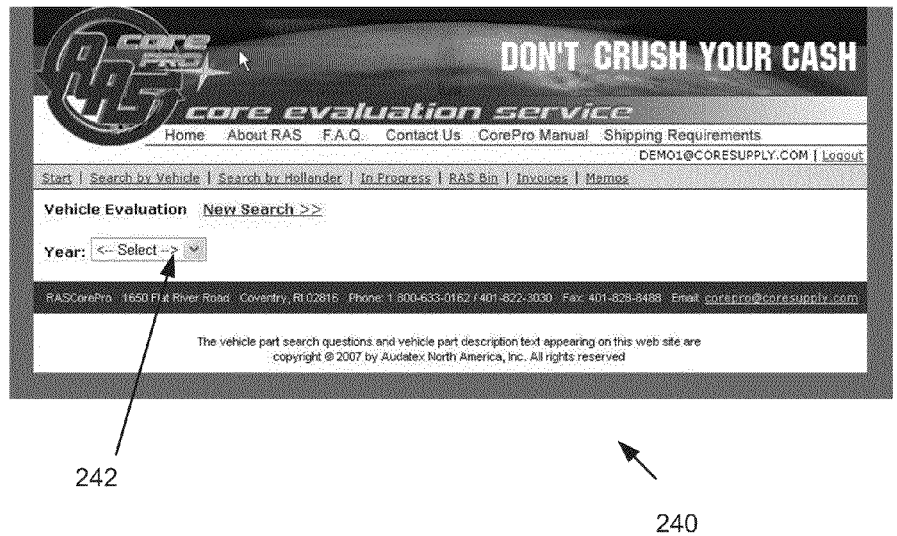
Figure 2D:
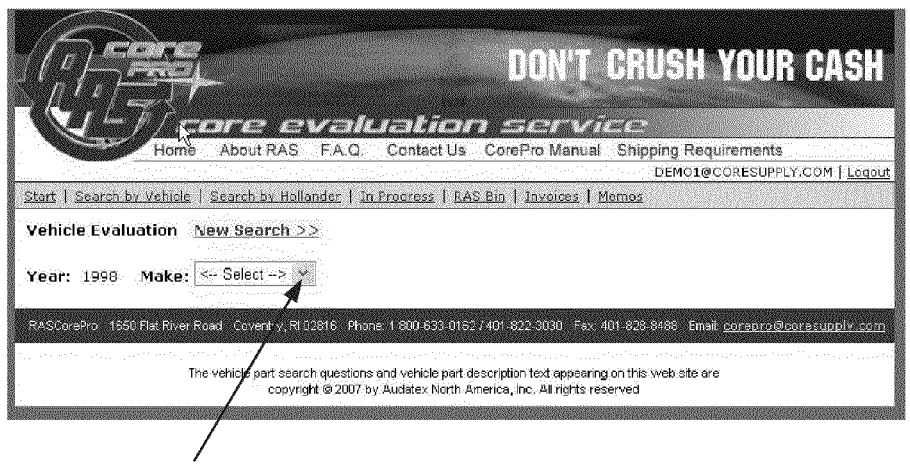
Figure 2E:
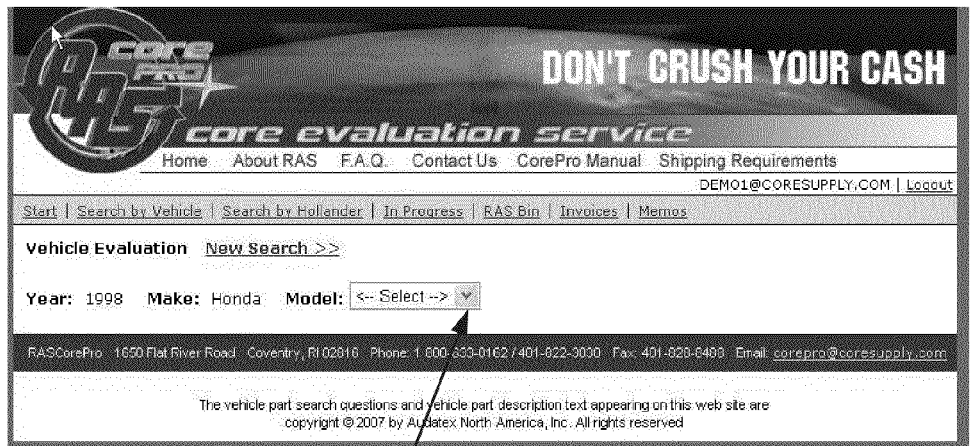
Figure 2F:
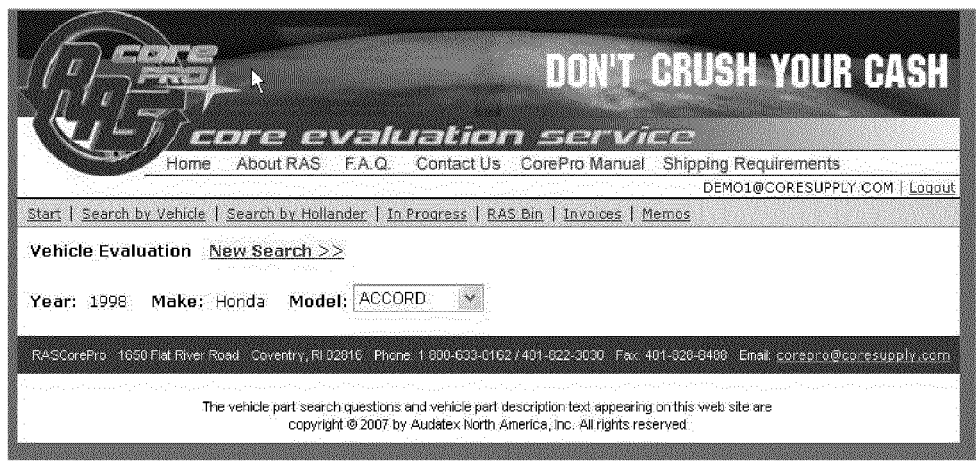
Figure 2G:
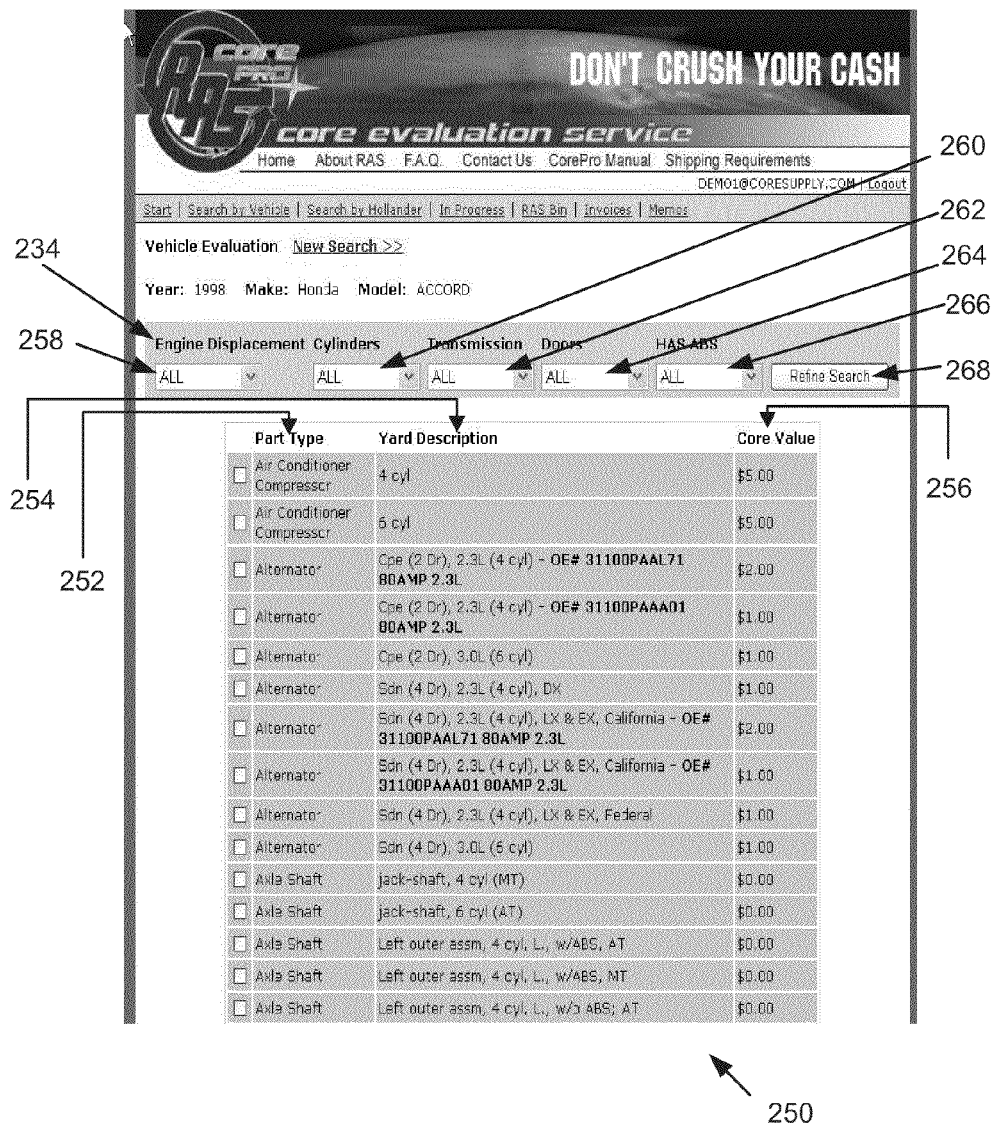
Figure 2I:
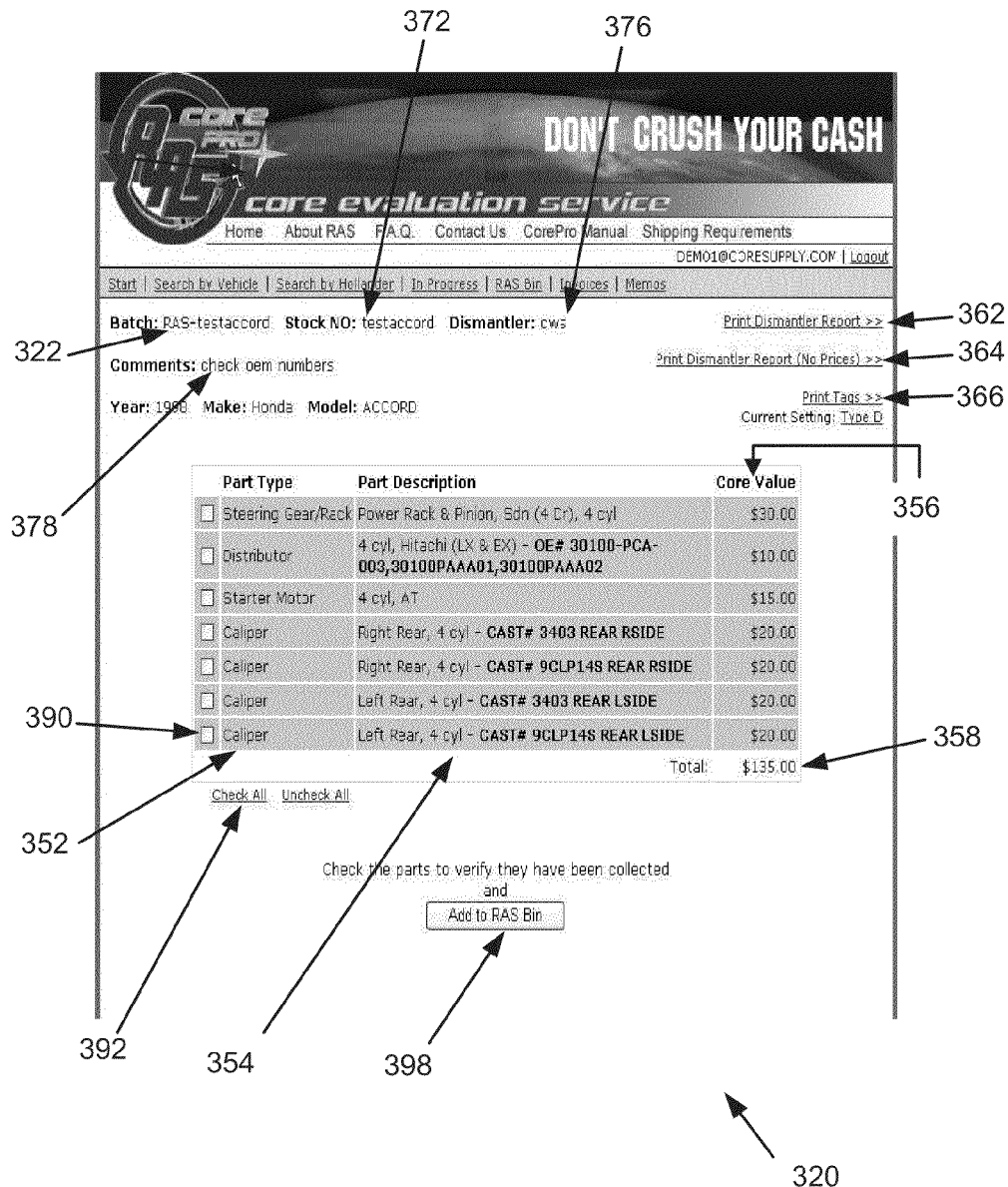
Figure 2J:
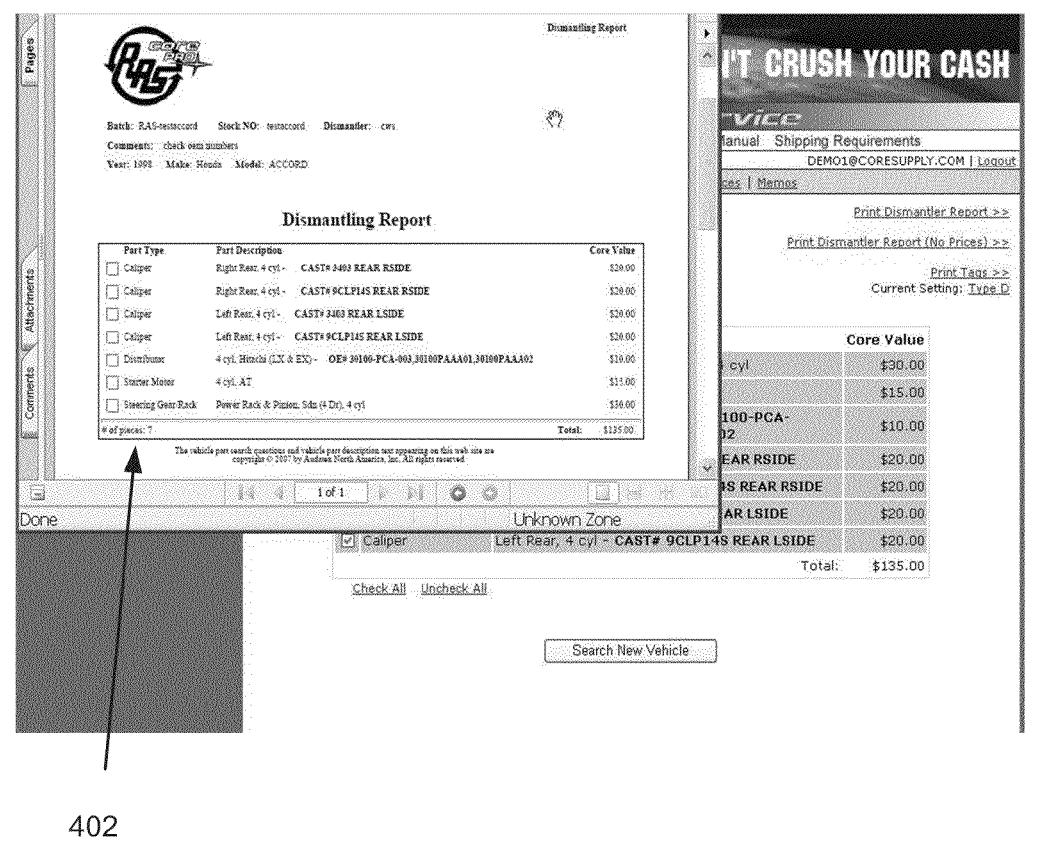
Figure 2K:
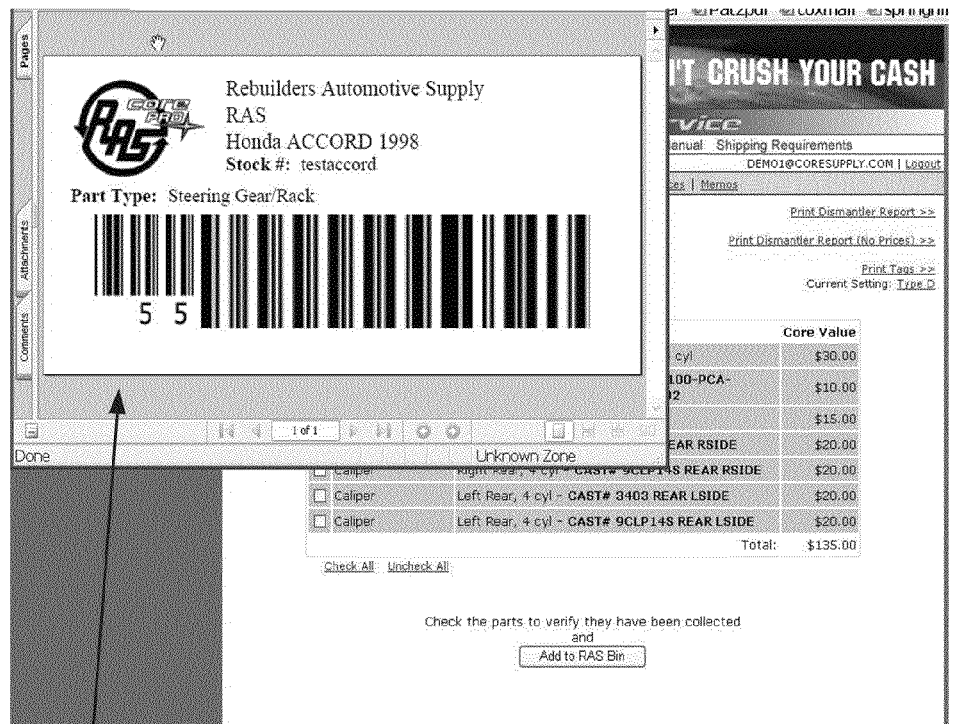
Figure 2L:
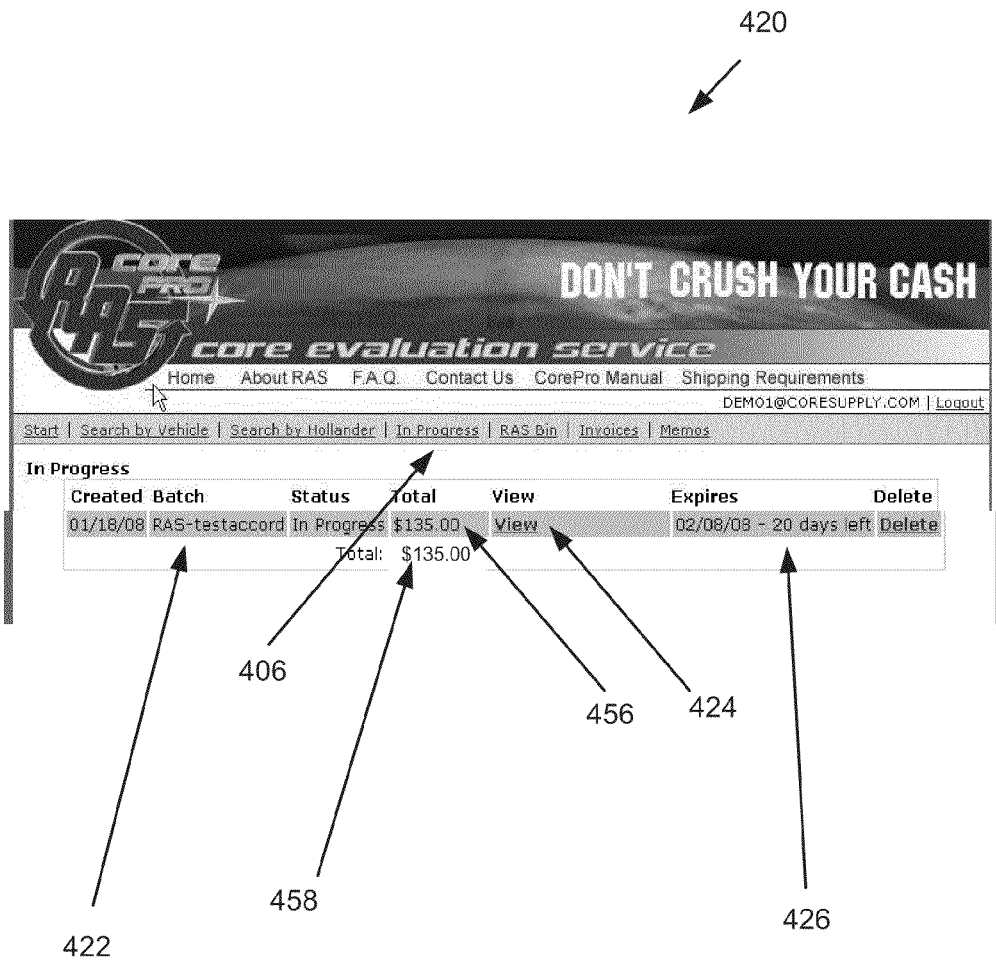
Figure 2M:
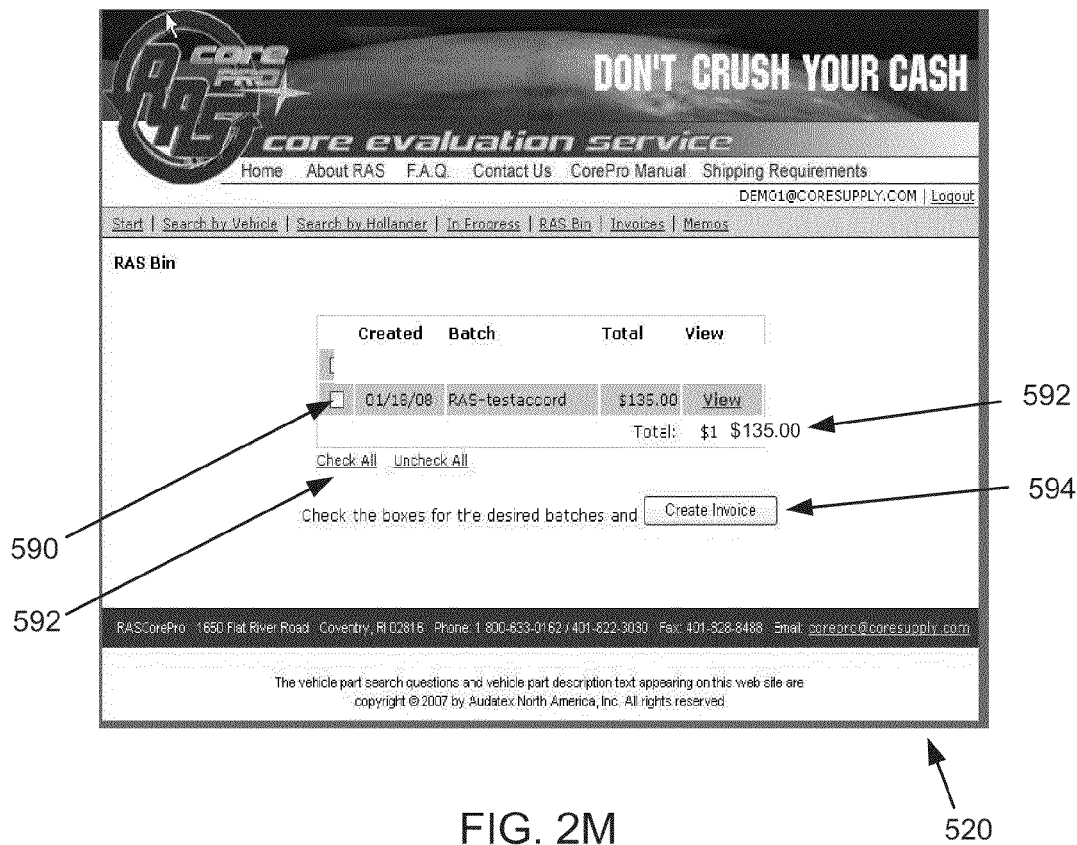
Figure 2N:
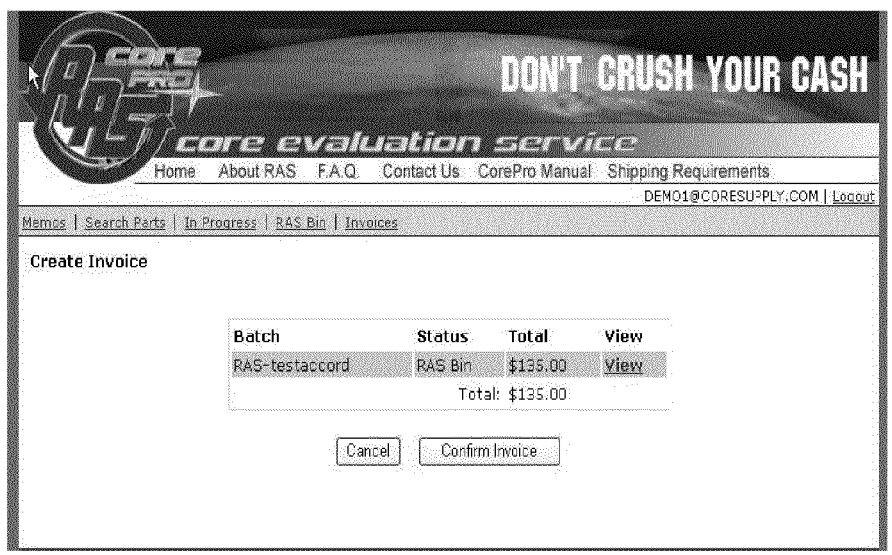
Figure 2O:
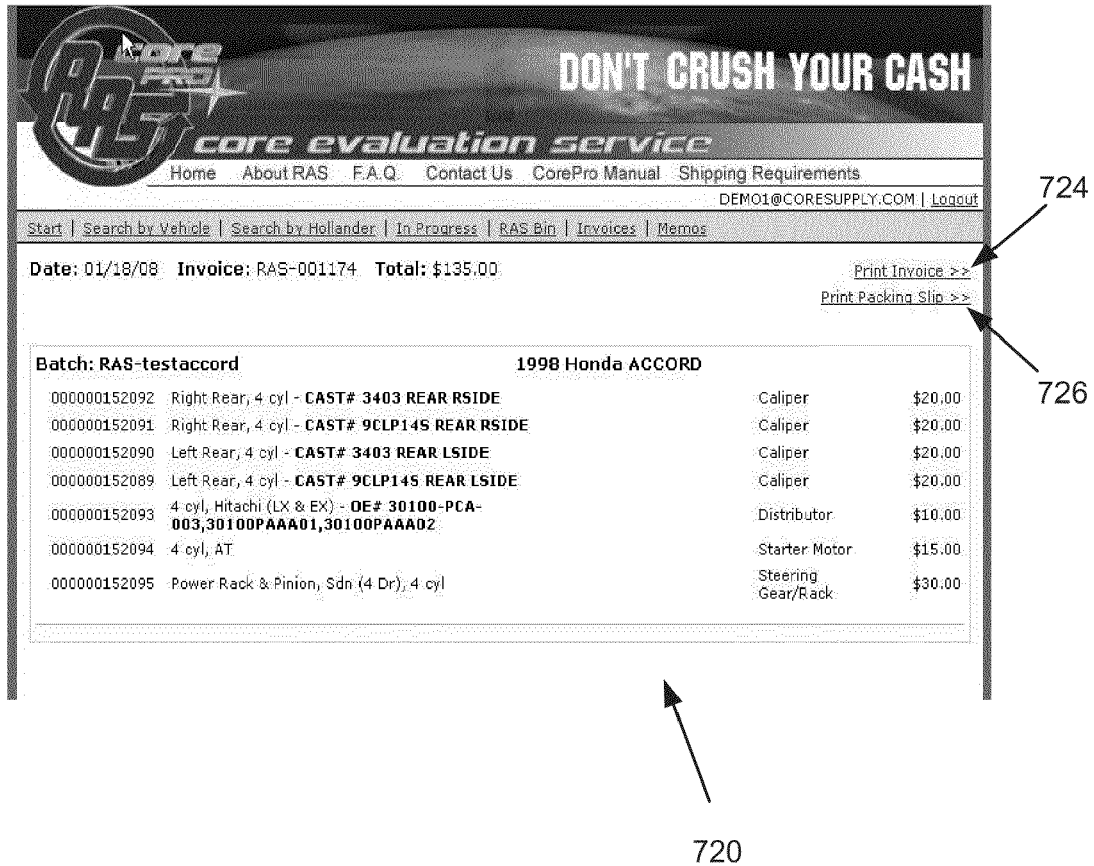
Figure 2R:
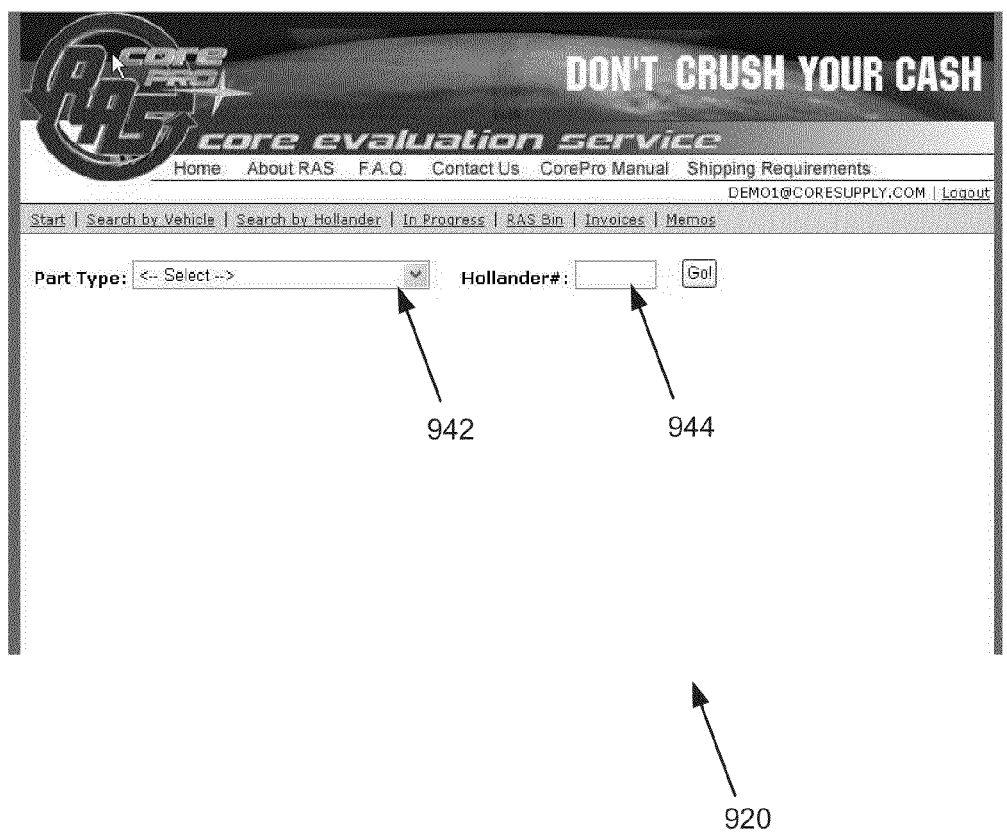
Figure 2S:
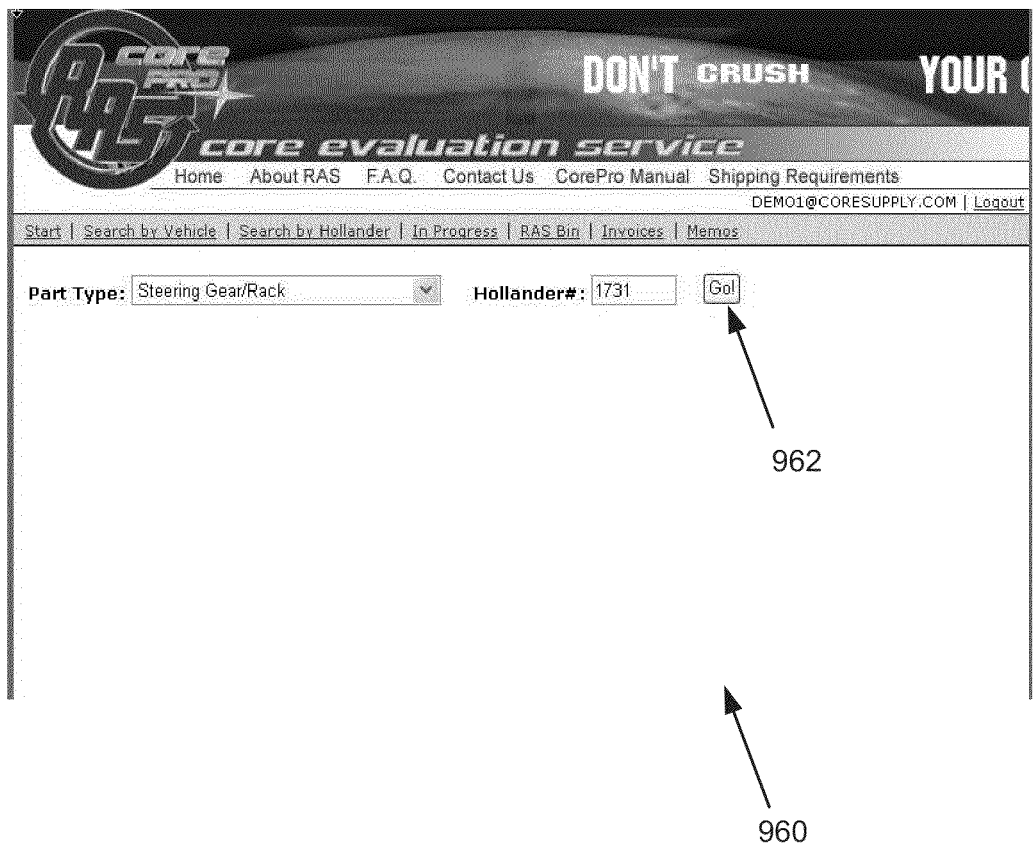
Figure 2T:
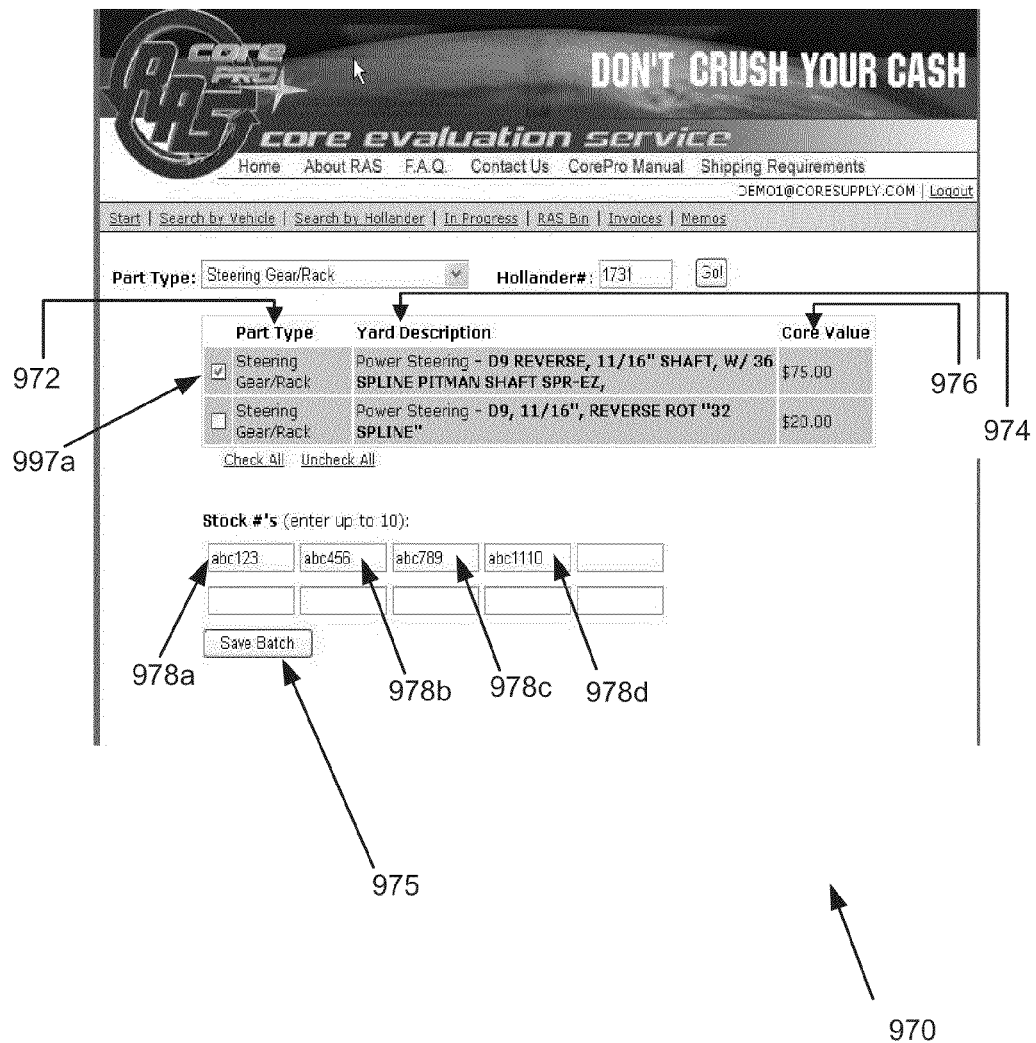
Figure 2U:
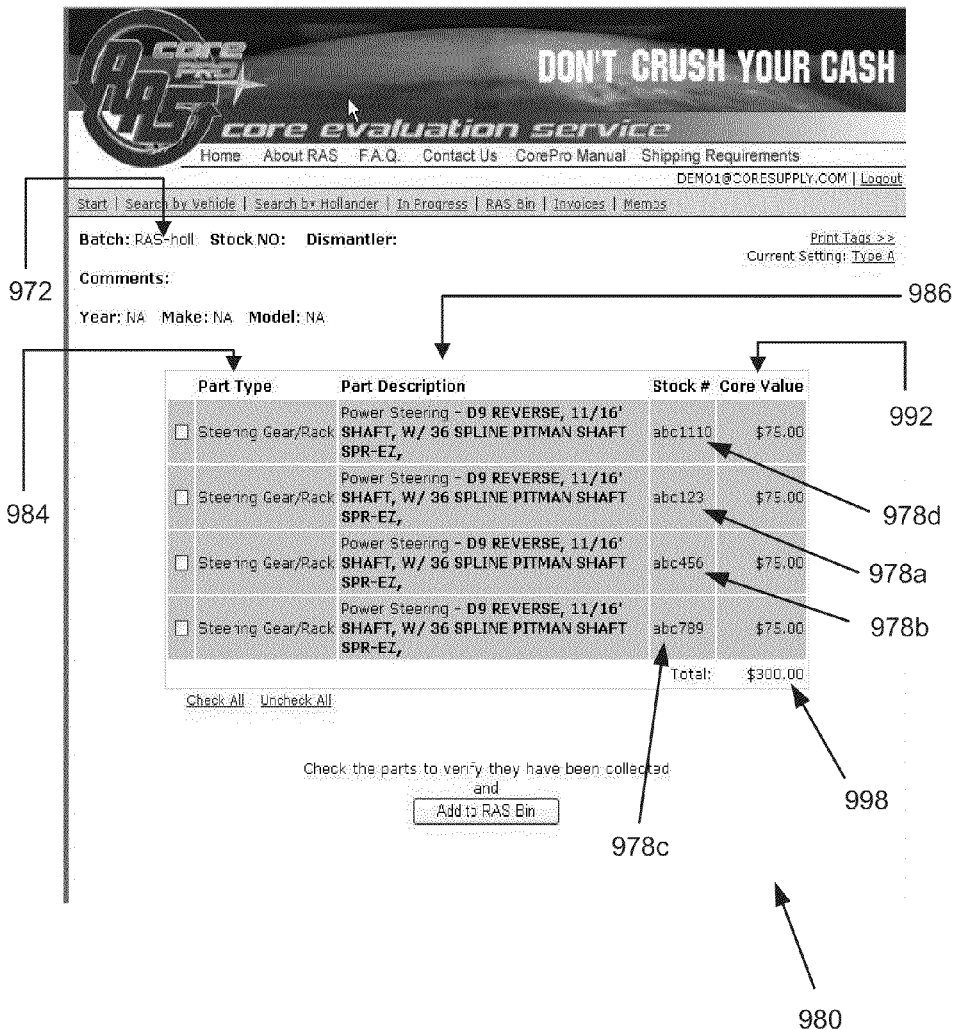
Figure 2V:
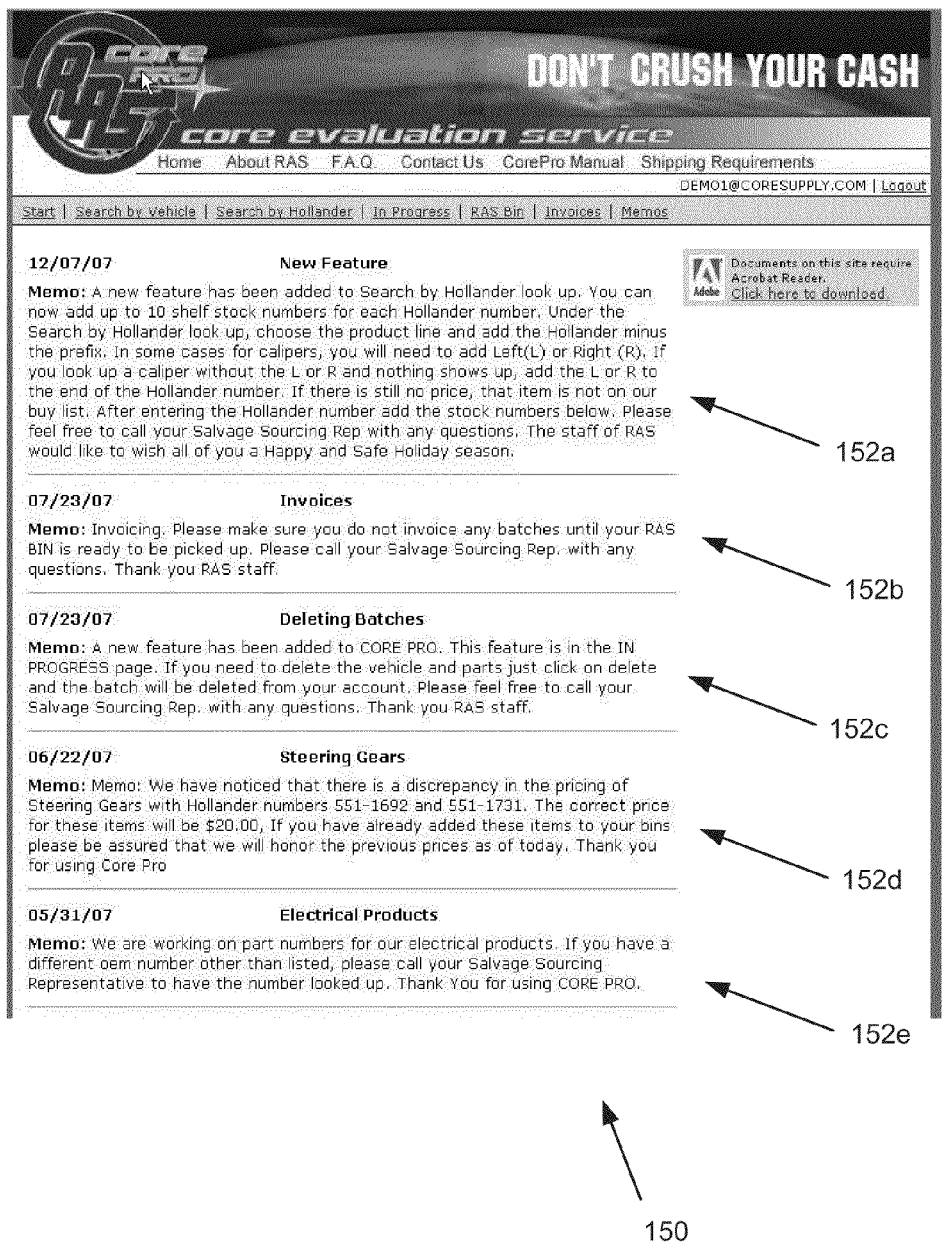
Figure 2W:
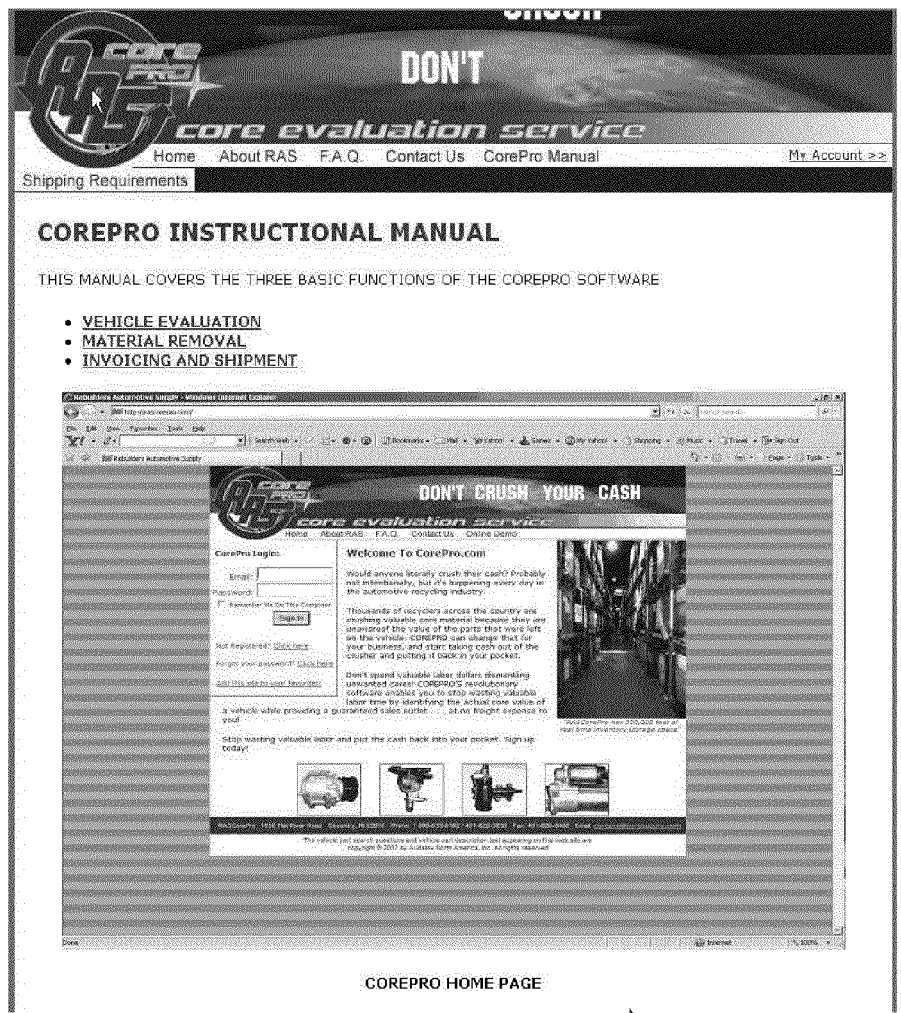

FIGS. 2A-2W show example user interface screens that are generated by the automotive core fulfillment system 10 of FIG. 1. The system logon page 200 is illustrated in FIG. 2A. On this logon page 200, a user (such as automotive recycler 6) may access the automotive core fulfillment system 10 by entering an email address in a sign in block 202 and by entering a password in password block 204 by using terminal 4 via network 2. Users that have not previously accessed the automotive core fulfillment system may register to use the system by accessing a registration hotlink 206.

As shown in FIG. 2B, once a user (automotive recycler 6) has accessed the automotive core fulfillment system 10, the interface module 30 generates a start screen 220. The start screen 220 enables an automotive recycler 6 to interact with the automotive core fulfillment system 10 by accessing demand and pricing information for automotive cores by searching vehicles using button 221 and by searching by automotive core interchange numbers using button 222. Start screen 220 also enables automotive recyclers 6 to access in-progress inventory information using button 223, core bin information using button 224, invoicing information using button 225, and additional system particulars, including system memos using button 226, frequently asked questions using link 227, contact information using link 228, the automotive core fulfillment system manual using link 229, and shipping requirements using link 230. Additional information regarding the automotive core fulfillment system of the present invention may also be shown and accessed through additional buttons, hot links, and other user interface devices that enable an automotive recycler 6 to access the automotive core fulfillment system 10 using terminal 4 via network 2.

Search by Vehicle

A user may search for automotive cores by a particular vehicle. For example, if an automotive recycler 6 selects the search vehicle button 221, a user input screen 240 as shown in FIG. 2C is generated by interface module 30 to allow the automotive recycler 6 to enter vehicle information, including Year, Make, and Model, into the automotive core fulfillment system 10 to access core information. To access the core information, automotive recycler 6 selects the Year the car was manufactured using drop down box 242. In this example, the automotive recycler 6 selected "1998." The user interface screen 240 shown is implemented using drop down menu selections, but it may be implemented using an expandable tree structure for such vehicle information, or in any other appropriate manner that conveys the necessary information with which to search the databases 40, 50, 70 of the automotive core fulfillment system 10.

As shown in FIG. 2D, once the automotive recycler 6 selects the Year the car was manufactured, the automotive recycler 6 selects the Make of car using drop down box 244. In this example, the user selected "Honda." As further shown in FIG. 2E, once the automotive recycler 6 selects the Make of car, the automotive recycler 6 selects the Model of car using drop down box 246. In this example, the automotive recycler 6 selects "Accord" as shown in FIG. 2F.

Figure 3:
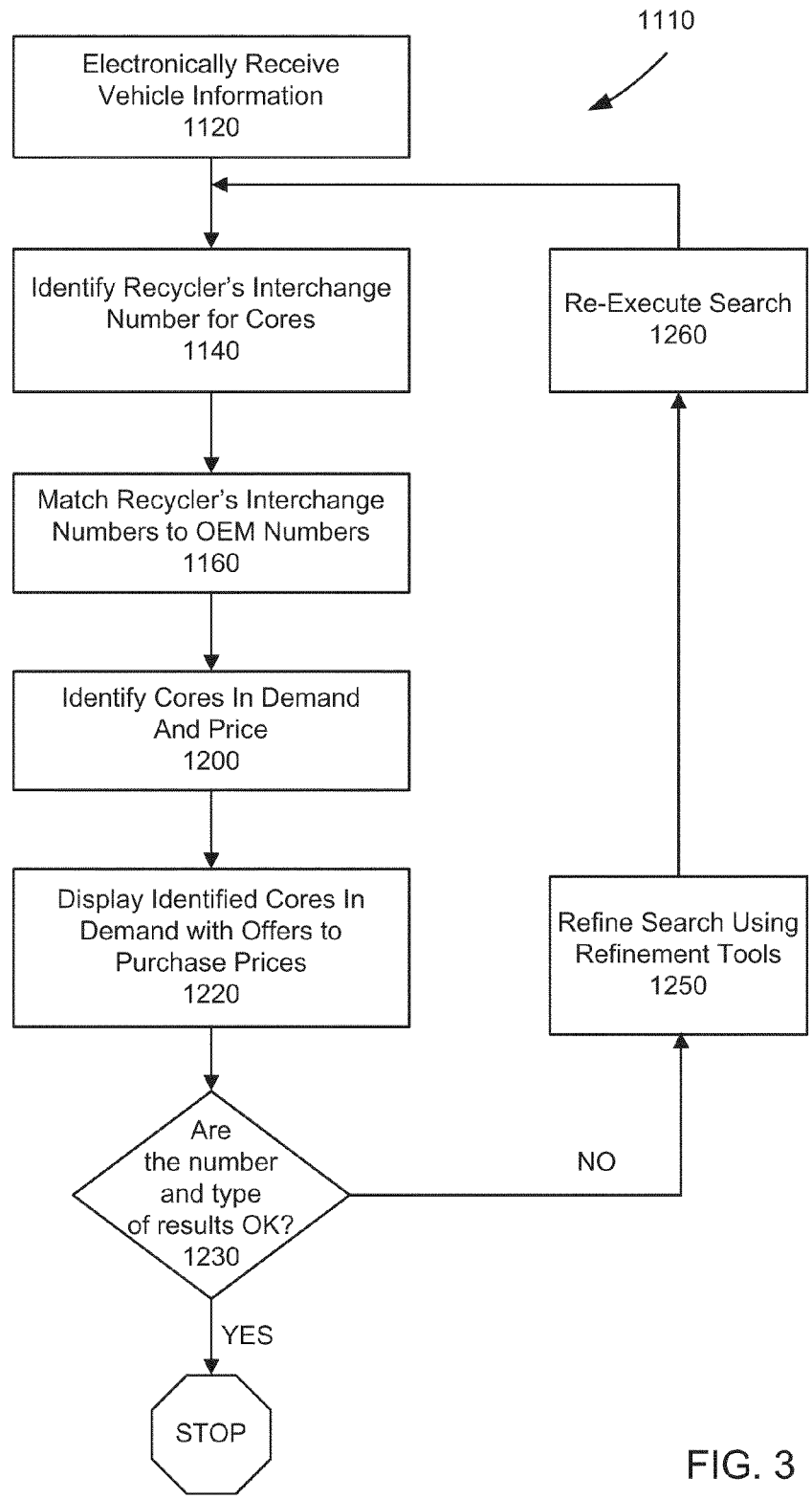
FIG. 3 is a flow diagram schematically illustrating a method of determining a core value based upon vehicle and part identification information in accordance with one embodiment of the present invention.

FIG. 3 is a flow diagram 1100 that schematically illustrates a method of operation in accordance with one embodiment of the present invention. Once the automotive recycler 6 has completed selecting the Year, Make, and Model of car from which to base the search, the automotive core fulfillment system 10 receives the vehicle information as shown in step 1120 in the flow chart of FIG. 3. Of course, multiple vehicles may be used from which to base the search and to identify multiple cores simultaneously. For example, a list of vehicle identifiers may be used, such as a manual list, a bar code or bar codes, an electronic VIN number or VIN numbers, or any other notation of multiple vehicle vehicles. With this vehicle identifier information, a core inventory value may be determined based upon an aggregate total of core values of identified automotive cores. Of course, other means of providing the vehicle information may also be used, such as direct data feeds, RSS feeds (RDF site summary feeds or Really Simple Syndication feeds), and the like.

Regardless of the manner in which the vehicle information is provided, in step 1120, automotive core fulfillment system 10 receives the vehicle information via interface module 30.

As further shown in step 1140 of FIG. 3, once the automotive core fulfillment system 10 receives the vehicle information, the processor 20 directs a search of the interchange database 40 to identify the recycler's interchange number for the core or cores. In step 1160, the interchange number matching module 60 and the processor 20 match the recycler's interchange numbers from the interchange database 40 to the core supplier numbers, such as the OEM numbers in OEM Number database 50 in the present example.

In step 1200 of FIG. 3, interchange number matching module 60 and the processor 20 identifies those cores for the inputted vehicle (1988 Honda Accord) and processor 20 accesses demand and pricing database 70 to further identify those cores for which there is demand. The processor 20 and interface module 30 then identifies the salvage value for the particular cores identified. Once the cores and their respective demand and pricing information is determined, in step 1220 of FIG. 3, the system returns a vehicle evaluation page 250 that shows the part type 252, yard description 254, and core value 256 of the particular automotive core as illustrated in FIG. 2G. Additionally, as shown in FIG. 3, if the number and type of results identified are not satisfactory in step 1230, the search may be further refined to narrow down the number and type of results returned using refinement tool search mechanism 234 as shown in step 1250. For example, the results may be refined based upon engine displacement 258, the number of cylinders 260, the transmission type 262, the number of doors 264, and the braking system 266. Of course other factors may also be used to refine the search, including drive type (front wheel versus rear wheel versus all wheel), and the like. When the refinement tools are selected, the search may be re-executed in step 1260 using the refine search button 268. The results of the refined search will then be presented as the vehicle evaluation page 250.

Vehicle evaluation page 250 lists automotive parts that the core supplier wishes to purchase and the offer price that the core supplier is willing to pay to a dismantler or to a recycler or to a salvage yard for the particular part. The vehicle evaluation page 250 returns a list of parts with the part type 252 and a yard description 254 with which to identify each core. The yard description 254 may also include appropriate interchange numbers, such as Hollander numbers or Lester numbers, and the like, as well as OEM descriptions to help further determine the identity of each part. Additionally, the core supplier may also provide additional descriptive information with which to identify and confirm the parts listed. Further, the listed parts may also include additional description information requiring a Cast number or an OEM number on the part in order for the part to be worth the core value listed. For example, cast descriptions may be shown in bold face type, while other information may be displayed in italics or within parentheses or in any similar manner so as to identify the notations in the yard description 254 field. The core value 256 is listed for each part offered by the core recycler. Cores that have no demand or no value to remanufacturers may be listed with a core value of $0.00 as in the present example, or may be omitted from the vehicle evaluation page 250. The core values help automotive dismantlers determine if it is cost effective to remove particular cores from the vehicle. Of course, vehicle evaluation page 250 may display different interchange numbers, be arranged differently, and provide additional information in other implementations of the present invention.

As shown in FIG. 2H, automotive recycler 6 can select those cores that the automotive recycler 6 wishes to remove from the vehicle and sell to the core supplier by checking boxes 97a-97g. The checked boxes 97a-97g correspond to those cores to be removed from the vehicle and sold to the core supplier at the offered purchase price displayed as core value 256. As further shown in FIG. 2H, once the automotive recycler 6 checks the parts that they wish to remove, the automotive recycler 6 may enter the stock number 272, vehicle identification number (VIN) 274, a dismantler 276, any notes 278 or special instructions.

Optionally, the system of the present invention may also include an optional button or hot link indicating or confirming that by submitting this batch of core parts, the automotive recycler 6 agrees to comply with any materials requirements specified by the core supplier or any other shipping and exchange policies that the core manufacturer has put in place.

Once the automotive recycler 6 completes these entries, the automotive recycler 6 may select the Save Batch button 280 and advance to the Vehicle Summary page 320 shown in FIG. 2I. The Vehicle Summary page 320 is the list of material that the automotive recycler 6 has chosen for removal from the vehicle in question. The Vehicle Summary page 320 shows the batch 322, the stock number 372, dismantler 376, and comments 378 for the year, make, and model vehicle of interest. The Vehicle Summary page 320 further shows the part types 352, part descriptions 354, and the core values 356 for each of the parts that the automotive recycler 6 selected with the check boxes 97a-97g on the vehicle evaluation page 250. A total core value 358 is shown that is the sum of the individual core values 356 for each of the parts listed.

From the Vehicle Summary page 320, an automotive recycler 6 may then view and print a dismantling report by selecting the print dismantler report button 362. Similarly, a dismantler report may be printed without core value prices by selecting the print dismantler report (no prices) button 364. For example, by selecting print dismantler reporter report button 362, the dismantling report 402 depicted in FIG. 2J may be viewed and printed and given to the dismantler to ensure the appropriate parts are collected.

Similarly, returning to FIG. 2I, part tags may be printed to attach to each of the parts as the vehicle is dismantled. The dismantler may then attach tags to the parts as they are removed from the vehicle. By selecting print tags button 368, the tag 404 depicted in FIG. 2K may be viewed and printed and then given to the dismantler to attach to the removed part for inventory control.

The system and method of the present invention may use the tags and tag printers of the automotive recycler 6 and may be printed in a uniform format for ease of inventory control, shipping, and payment upon receipt by the core supplier. Further, a number of tag options may be presented to the automotive recycler 6 the first time that the automotive recycler 6 prints tags. The options may then be saved as a default format with which to print the tags to attach to the parts as the parts are removed from the vehicles.

After the automotive recycler 6 prints the dismantling report 402 and the tags 404, the automotive recycler 6 may then begin dismantling the vehicle, add notes or memos to the system, log out, or create additional reports on other vehicles and parts.

Once the vehicle has been dismantled, and the dismantler has returned the paperwork indicating which parts were actually removed, the automotive recycler 6 may now add the removed parts to the BIN inventory. The typical core supplier BIN is considered to be a 48" cube Gaylord box where all the tagged cores you remove are placed. Of course, other bin types and shipping and storage containers may also be used depending upon the typical shipments, inventory values, and methods of transportation required.

To add the dismantled items to the BIN inventory, the automotive recycler 6 must verify that the parts have been removed from the vehicle. To verify that the parts have been removed, the automotive recycler selects the In Progress tab 406, such as that shown on FIG. 2L. FIG. 2L shows the In Process page 420 that lists the in-progress vehicles by batch 422, (generated from stock number 272 entered on the vehicle evaluation page 250). The automotive recycler 6 may then select the proper batch 422 and click on the view link 424. Selecting the view link 424 returns the Vehicle Summary page 320 for the particular vehicle.

As shown in FIG. 2L on the In Process page 420, the in-progress batch includes an expiration date 426. To accommodate constantly changing markets for core parts, the core supplier may restrict the time that the automotive recycler 6 is afforded in which to process a vehicle. In the example of FIG. 2L, the core supplier allowed a 21-day window in which to process the vehicle. If the automotive recycler 6 has not processed the vehicle within the 21-day timeline, the view link 424 will change to a "re-evaluate link" (not shown). If the automotive recycler 6 selects the re-evaluate link, the automotive recycler 6 will return to the vehicle evaluation page 250. Any parts that were initially chosen for removal will remain checked off on the vehicle evaluation page 250, and the automotive recycler 6 must re-evaluate the removal decisions based on any new market prices and demand, if applicable. The automotive recycler 6 must then re-save the batch with the new prices.

An overall dollar value is displayed for your entire "In Progress" inventory. A total in-process value 458 is shown that is the sum of the individual in-process batch totals 456 for each of the batches listed. In the example of FIG. 2L, a single batch 422 is listed, so the total in-process value 458 is the same as that of the single batch total 456. In this example, the total is $135.00.

As outlined above, once the automotive recycler 6 selects the view link 424 from the "In Progress" page 420, the "vehicle summary" page 320 as shown in FIG. 2I is displayed. The automotive recycler 6 then checks the boxes 390 indicating the parts that the dismantler removed from the vehicle. Alternatively, if all indicated parts were removed, the automotive recycler 6 may select the check all box 392, indicating that the dismantler removed all the parts.

Once the automobile recycler 6 verifies that parts were removed and placed in the core supplier BIN, the automotive recycler 6 selects the "Add to RAS Bin" button 398. By selecting the "Add to RAS Bin" button 398, the checked parts are added to the automotive recycler's BIN inventory. Once the selected parts are added to the BIN inventory, the BIN screen 520 illustrated in FIG. 2M is displayed. As shown in FIG. 2M, the BIN screen 520 includes an indication of the total dollar amount 522 of the automotive recycler's inventory.

The BIN inventory is electronically monitored by the core supplier. The system and method of the present invention permits the core supplier to keep a running total of the number of parts and the dollar value of the parts in the BIN inventory. The core supplier contacts the automotive recycler 6 to schedule a materials pick up when it appears that the automotive recycler 6 has enough parts in the BIN inventory to warrant a shipment. Flexibility is built into the system of the present invention, and if the automotive recycler 6 has an inordinate volume of inventory, or an inventory with a high dollar value, additional pick ups may be scheduled through the BIN screen 520.

Once the Bin contents are confirmed, the automotive recycler 6 checks box 590 to select the created batch. Alternatively, the automotive recycler 6 may check the check all button 592 to choose all material currently in the BIN inventory. Once the appropriate batches have been checked, the automotive recycler 6 selects the "Create Invoice" button 594 to create an invoice 620 as shown in FIG. 2N.

After invoice 620 is displayed, the automotive recycler 6 may review the invoice 620 and then confirm the invoice 620. To ensure accuracy with in-transit inventory, the automotive recycler 6 confirms the accuracy of the invoice 620 before the material is removed from inventory. To confirm the invoice 620, the automotive recycler 6 selects the "confirm invoice" button 624. The process then advances to the Invoice Detail page 720 as shown in FIG. 2O. After creating an invoice 620, the inventory material is electronically removed from the core supplier BIN, and the core supplier is automatically notified electronically. The core supplier then contacts the automotive recycler 6 with a Purchase Order Number and arranges for shipping.

As shown in FIG. 2O, from the Invoice Detail page 720, the automotive recycler 6 may print the invoice and/or a packing slip by selecting the respective print buttons 724, 726. Selecting the print invoice button 724 displays invoice 820 as shown in FIG. 2P, while selecting print packing slip button 726 displays packing slip 830 as shown in FIG. 2Q. The invoice 820 and packing slip 830 may then be included with the parts shipment or kept with the automotive recycler's records. Once the Bins are shipped and the materials arrive at the core supplier facility, the materials are checked in using the appropriate stock number, invoice, and packing slip. Upon completion of the check in, a reconciliation report and payment is sent to the automotive recycler 6.

Search by Interchange Number

In addition to searching the automotive core fulfillment system 10 by vehicle, an automotive recycler 6 may search by interchange number, such as a Hollander number, a Lester number, and the like.

For example, returning to start screen 220 shown in FIG. 2B, a user (automotive recycler 6) may search for automotive cores by searching by Hollander number. For example, if automotive recycler 6 selects the search by Hollander button 222, a user input screen 920 as shown in FIG. 2R is generated by interface module 30 to allow an automotive recycler 6 to enter a part type and a Hollander number into the automotive core fulfillment system to access core information. Of course, other interchange information may be used instead of Hollander numbers, but in the present example, an interchange number search is illustrated using Hollander numbers. To access the core information, a user selects the part type using drop down box 942 and enters a Hollander number in box 944. As shown in FIG. 2S, in this example the user selected "Steering Gear/Rack" and Hollander number 1731. The user interface screens 920, 960 shown in FIG. 2R and FIG. 2S are implemented using drop down menu selections, but they may be implemented using an expandable tree structure for such vehicle information, or in any other appropriate manner that conveys the necessary information with which to search the databases 40, 50, 70 of the automotive core fulfillment system 10.

Once the part type and interchange number are entered, the automotive recycler 6 selects the Go box 962 in FIG. 2S, and the system returns vehicle evaluation page 970 of FIG. 2T that shows the part type 972, yard description 974, and core value 976 of the particular automotive cores. As was the case when searching by vehicle, vehicle evaluation page 970 lists automotive parts that the core supplier wishes to purchase and the offer price that the core supplier is willing to pay to a dismantler or to an automotive recycler or to a salvage yard for the particular part. The vehicle evaluation page 970 returns a list of parts with the part type 972 and a yard description 974 with which to identify each core. The yard description 974 in this search may also include appropriate OEM descriptions to help determine the identity of each part. Additionally, the core supplier may also provide additional descriptive information with which to identify and confirm the parts listed. Further, the listed parts may also include additional description information requiring a Cast number or an OEM number on the part in order for the part to be worth the core value listed. For example, cast descriptions may be shown in bold face type, while other information may be displayed in italics or within parentheses or in any similar manner so as to identify notations in the yard description 974 field. The core value 976 is listed for each part offered by the core recycler. As above, cores that have no demand or no value to remanufacturers may be listed with a core value of $0.00 or may be omitted from the vehicle evaluation page 970. The core values help automotive dismantlers determine if it is cost effective to remove particular cores from the vehicle. Of course, vehicle evaluation page 970 may display different part types, descriptions, interchange numbers, and may be arranged differently to provide additional information in other implementations.

As shown in FIG. 2T, the automotive recycler 6 indicates the parts that the automotive recycler 6 wishes to remove from the vehicle and sell to the core supplier by checking box 997a. The checked box 997a corresponds to that core to be removed from the vehicle and sold to the core supplier at the offered purchase price (core value 976) displayed. As further shown in FIG. 2T, once the automotive recycler 6 checks the parts that they wish to remove, the automotive recycler 6 may enter stock numbers 978a-978d and save the batch by selecting the save batch button 975. Of course additional information may also be added to the batch, including, for example vehicle identification numbers (VINs), dismantler information, and any notes or special instructions.

Optionally as above, the system of the present invention may also include an optional button or hot link indicating or confirming that by submitting this batch of core parts, the automotive recycler agrees to comply with any materials handling requirements specified by the core supplier or any other shipping and exchange policies that the core manufacturer has put in place.

Once the stock numbers 978a-978d are entered and the automotive recycler 6 saves the batch by selecting the save batch button 975, the batch results of the search will then be presented as the vehicle summary page 980 shown in FIG. 2U. As was the case above when searching by vehicle, the Vehicle Summary page 980 is the list of material that the automotive recycler 6 has chosen for removal from the vehicle in question. Similarly, the Vehicle Summary page 980 shows the batch 982 and the listing of part types 984, part descriptions 986, and core values 992 as sorted by the stock numbers 978a, 978b, 978c, 978d. A total core value 998 is shown that is the sum of the individual core values 992 for each of the parts listed.

Once the automotive recycler 6 reviews the vehicle summary page 980, the process continues in a similar manner as was the case outlined above with regard to FIG. 2I to FIG. 2Q when interacting with the automotive core fulfillment system 10 of the present invention by searching by vehicle.

Memos

In addition to searching the automotive core interchange system 10 by vehicle or by interchange number, the automotive core fulfillment system 10 includes the facility to review critical system information by selecting the memos button 226 shown in FIG. 2B. When an automotive recycler 6 selects the memos button 226, memos screen 150 is displayed as shown in FIG. 2V. Memos screen 150 includes example updates 152a, 152b, 152c, 152d, 152e to information regarding the automotive core fulfillment system 10 and the features and capabilities provided.

Manual

In addition to searching the automotive core fulfillment system 10 by vehicle or by interchange number and accessing memos regarding updates and other information, the automotive core fulfillment system 10 includes the facility to review the operations manual by selecting the manual button 229 shown in FIG. 2B. When an automotive recycler 6 selects the manual button 229, the instruction manual screen 170 is displayed as shown in FIG. 2W. Instruction manual screen 170 includes step-by-step instructions to effectively utilize the automotive core fulfillment system 10 of the present invention and provides a graphical foundation for updates to information regarding the automotive core fulfillment system 10 and the features and capabilities provided.

The automotive core fulfillment system 10 in accordance with the illustrated embodiment as described above is invaluable to automotive recyclers because it allows them to determine what the cores of a particular vehicle and their core inventory is truly worth, while also enabling them to have better control over labor costs. As described, the present invention allows automotive recyclers to control their labor costs because they will no longer waste time removing core parts that have little or no value, and can readily identify the core parts with value.

Moreover, the automotive core fulfillment system 10 in accordance with the illustrated embodiments provides an especially advantageous use in that it can be used during the dismantling process before the vehicle is moved into storage, for example, in a salvage yard, thereby allowing the automotive recycler 6 to remove a wider range of cores that are of value. The system and method of the present invention allows the automotive recycler 6 to make quick determinations as to whether to invest in the labor required to remove the particular automotive cores with value.

For example, a power brake booster core for a particular vehicle model may be worth $15 based on current demand and pricing information as provided by database 70. With the vehicle in the dismantling facility of the automotive recycler, the removal of the core with the available tools in the dismantling facility may only be 5-10 minutes, thus, making it economically worthwhile to remove the brake booster core. If the brake booster core has to be removed while the vehicle is in the storage facility of the automotive recycler, it may take much longer, for example, 15-20 minutes. Such labor requirements would render the brake booster core not worth removing.

Automobile Auction Example

Automotive recyclers may acquire used automobiles from automobile auctions. The automobiles up for auction include a number of automotive parts and automotive cores. Auction bids can be based upon the value of major part types in the automobiles, such as engines, transmissions, doors, wheels, catalytic converters, and the like. Bids can also be based upon the value of automotive cores in the automobiles up for auction. Some of the automobile part types and automobile cores may be immediately re-sellable, while others may be only periodically or infrequently in demand. At auction, the value of the automobile cores can be estimated based on a percentage of the estimated value of the vehicle or by including a one-size-fits-all flat fee for the automobile cores. The fixed percentage and the flat fee often inaccurately estimate the value of the automotive cores and consequently the estimated value of the vehicle up for auction.

The systems and methods described in the disclosed examples provide accurate automotive core values and vehicle evaluations at the time of bidding. With this accurate core value information, bidders can accurately determine the value of the vehicles up for auction and bid amounts based upon an aggregate value of the vehicle. Successful bids can be converted into purchase orders for those vehicles with valuable core parts. By providing a potential bidder with an in-hand purchase offer, the potential bidder can formulate a bid price knowing that a legal offer to buy the core inventory exists. The auction bidder can then more accurately determine a value of the vehicle (including core parts) up for auction. By facilitating future purchases of the vehicles, an auction house conducting the auction gains a competitive advantage over auction houses that do not provide this service. Likewise, bidders using the system and method gain an advantage over competitive bidders that do not have a purchase order, and insurance companies or other providers of the automobiles and cores up for auction gain an advantage because the overall bid prices may be higher.

For example, core value information can be provided to auction bidders to facilitate informed bidding on vehicles up for auction. Potential bidders can identify automobiles that they are interested in purchasing and determine the value of the automotive cores in the vehicle. The potential bidders can then formulate their bid price to include the value of the automobile cores in the vehicles. The identification may be top down, such as searching by vehicle as described above, where a potential bidder identifies a particular car and drills down to the type and value of automobile cores present in the particular make and model car. Similarly, the identification may be bottom up, such as searching by OEM numbers as described above, where a potential bidder identifies a particular automobile core and moves up an assembly hierarchy to a particular make and model car in which the desired automobile core is present. The automobile core can also be identified by interchange number as well. Automobile core value information can be provided to the bidder prior to the bidder's purchase or during the bidding process.

Figure 4:
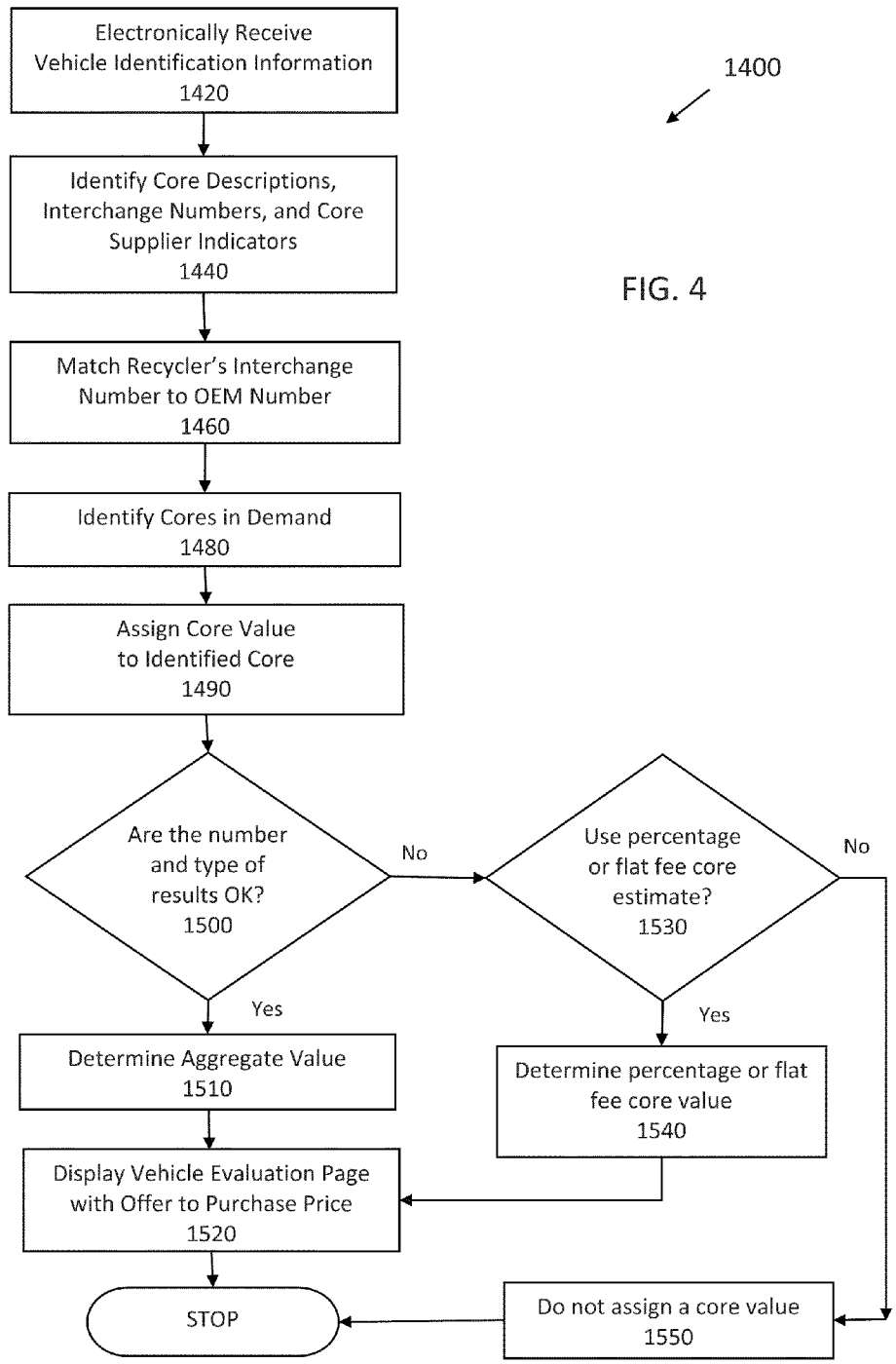
FIG. 4 is a flow diagram schematically illustrating a method of determining a vehicle value for bid at an auction based upon an aggregate core value using vehicle information.

FIG. 4 is a flow diagram 1400 that schematically illustrates a method of operation in accordance with an auction house embodiment. In the case of a top down identification, an auction house stands in for automotive recycler 6 and enters vehicle identifier information such as a VIN, a manual list, a bar code, an electronic VIN number, or any other notation of vehicle identification. In these examples, the automotive core fulfillment system 10 receives the vehicle information as shown in block 1420 in the flow chart of FIG. 4. Often, an auction house will enter vehicle identifier information for the lot of cars up for auction at a particular auction event. As above, multiple vehicles may be used from which to base the search and to identify multiple cores simultaneously. For example, a list of vehicle identifiers may be used, such as a manual list, a bar code or bar codes, an electronic VIN number or VIN numbers, or any other notation of multiple vehicles. With this vehicle identifier information, a core inventory value may be determined based upon an aggregate total of core values of identified automotive cores. The values of the identified automotive cores contribute to the value of the vehicle up for bidding. Of course, other means of providing the vehicle information may also be used, such as direct data feeds, RSS feeds (RDF site summary feeds or Really Simple Syndication feeds), and the like. Regardless of the manner in which the vehicle information is provided, in block 1420 automotive core fulfillment system 10 receives the vehicle information via interface module 30.

As further shown in block 1440 of FIG. 4, once the automotive core fulfillment system 10 receives the vehicle information, the processor 20 processes the vehicle identifier information to determine the core inventory present in the particular make and model car as well as a value (price) of the corresponding core. For example, processor 20 can direct a search of the interchange database 40 to identify the recycler's interchange number for the core or cores. Processor 20 can also direct a search of the interchange database 40 to identify core descriptions. In block 1460, the interchange number matching module 60 and the processor 20 match the recycler's interchange numbers from the interchange database 40 to the core supplier numbers, such as the OEM numbers in OEM Number database 50 in this auction house example.

In block 1480 of FIG. 4, interchange number matching module 60 and the processor 20 identifies those cores for the inputted vehicle (for example, the 1988 Honda Accord). In block 1490, processor 20 and the demand and pricing database 70 assigns a core value to the identified automotive core. In block 1500, the number and type of identified cores can be evaluated. If the number and type of results identified are satisfactory in block 1500, the process continues to block 1510. If, however, the number and type of results identified are not satisfactory in block 1500, the core value determination can revert to an estimated percentage of the estimated value of the vehicle, to a flat fee core value, or to another estimated core value determination apart from using the actual value of the automotive cores. For example, if a percentage or flat fee core estimate is to be used in block 1530, the percentage or flat fee is determined in block 1540, and the estimated core value can be displayed on a vehicle evaluation page with an offer to purchase price in block 1520. If, in block 1530, a percentage or flat fee core estimate is not to be used in determining an estimated core value, no core value is assigned in block 1550, and a vehicle evaluation page with an offer to purchase price can be displayed in block 1520 without a core value listed or with core values of $0.00 for cores that have no value to the remanufacturers. Of course other factors and estimate techniques can be used in block 1530 to estimate the value of the core automotive parts in the particular automobile, but these estimates do not take benefit of actual core values determined by the above methods illustrated in the examples nor do they provide a dollar amount for the particular automotive cores present in the particular automobile.

For example, when the number and type of results of the search from block 1500 are identified the process resumes at block 1510. In block 1510, processor 20 accesses demand and pricing database 70 to further identify those cores for which demand exists. The processor 20 and interface module 30 then identifies the salvage value for the particular cores identified and aggregates the cores and their respective demand and pricing information in block 1510 of FIG. 4. The system returns a vehicle evaluation page 250 that shows the part type 252, yard description 254, and core value 256 of the particular automotive core as was illustrated above in FIG. 2G. This list of the vehicles, automobile cores, and their corresponding core inventory values can then be provided to the potential buyer/bidder in block 1520. The list provides value and pricing information for each of the automobile cores. The potential buyer can then use the aggregate list of core values to determine the aggregate total of core values of identified automotive cores in the vehicle or vehicles and thereby determine the value of the vehicle (or vehicles) being auctioned in order to determine a bid for that vehicle (or group of vehicles).

Vehicle evaluation page 250 lists the vehicle identification information and the automotive parts that the core supplier wishes to purchase as well as the offer price that the core supplier is willing to pay to a dismantler or to a recycler or to a salvage yard (or to an auction house or auction bidder) for the particular part. The vehicle evaluation page 250 returns a list of parts with the part type 252 and a yard description 254 with which to identify each core. The yard description 254 may also include appropriate interchange numbers, such as Hollander numbers or Lester numbers, and the like, as well as OEM descriptions to help further determine the identity of each part. Additionally, the core supplier may also provide additional descriptive information with which to identify and confirm the parts listed. Further, the listed parts may also include additional description information requiring a Cast number or an OEM number on the part in order for the part to be worth the core value listed. For example, cast descriptions may be shown in bold face type, while other information may be displayed in italics or within parentheses or in any similar manner so as to identify the notations in the yard description 254 field. The core value 256 is listed for each part offered by the core recycler. Cores that have no demand or no value to remanufacturers may be listed with a core value of $0.00 as in the present example, or may be omitted from the vehicle evaluation page 250. The core values help automotive dismantlers determine if it is cost effective to remove particular cores from the vehicle. Of course, vehicle evaluation page 250 may display different interchange numbers, be arranged differently, and provide additional information in other implementations of the present invention.

In this fashion, the returned list of vehicles and automobile cores and their corresponding core values provides a purchase order from the ultimate buyer (core supplier) to the bidder. The purchase order can indicate the core inventory, quantity, and price for the cores that the bidder may provide to the automotive recycler. The purchase offer can constitute a legal offer to buy the core inventory. In this manner, the auction bidder receives core pricing information to use in formulating his bid strategy. The auction bidder can step into the supply chain and know, prior to acquisition, the value of the automotive cores present in the vehicle up for auction. After acquiring the car, the auction bidder can then participate in dismantling the car or provide the vehicle and/or cores to an automotive recycler to dismantle or otherwise provide the automotive cores to the core supplier as described above.

In the case of a bottom up identification, the interchange database 40 of automotive core descriptions and corresponding interchange identification indicators can be used to determine makes and models of automobiles that include the desired automotive cores. Similarly, a core supplier database of automotive core descriptions and corresponding core supplier identification indicators, such as OEM number database 50, can also be used to determine makes and models of automobiles that include the desired automotive cores.

The core supplier identification indicators can be Original Equipment Manufacturer (OEM) numbers, casting numbers, and remanufacturer-specific proprietary stock keeping unit (SKU) numbers, for example, as well as manual lists, a bar code, an electronic OEM or SKU number, or any other notation of core supplier identification indicators received from a potential bidder.

Figure 5:
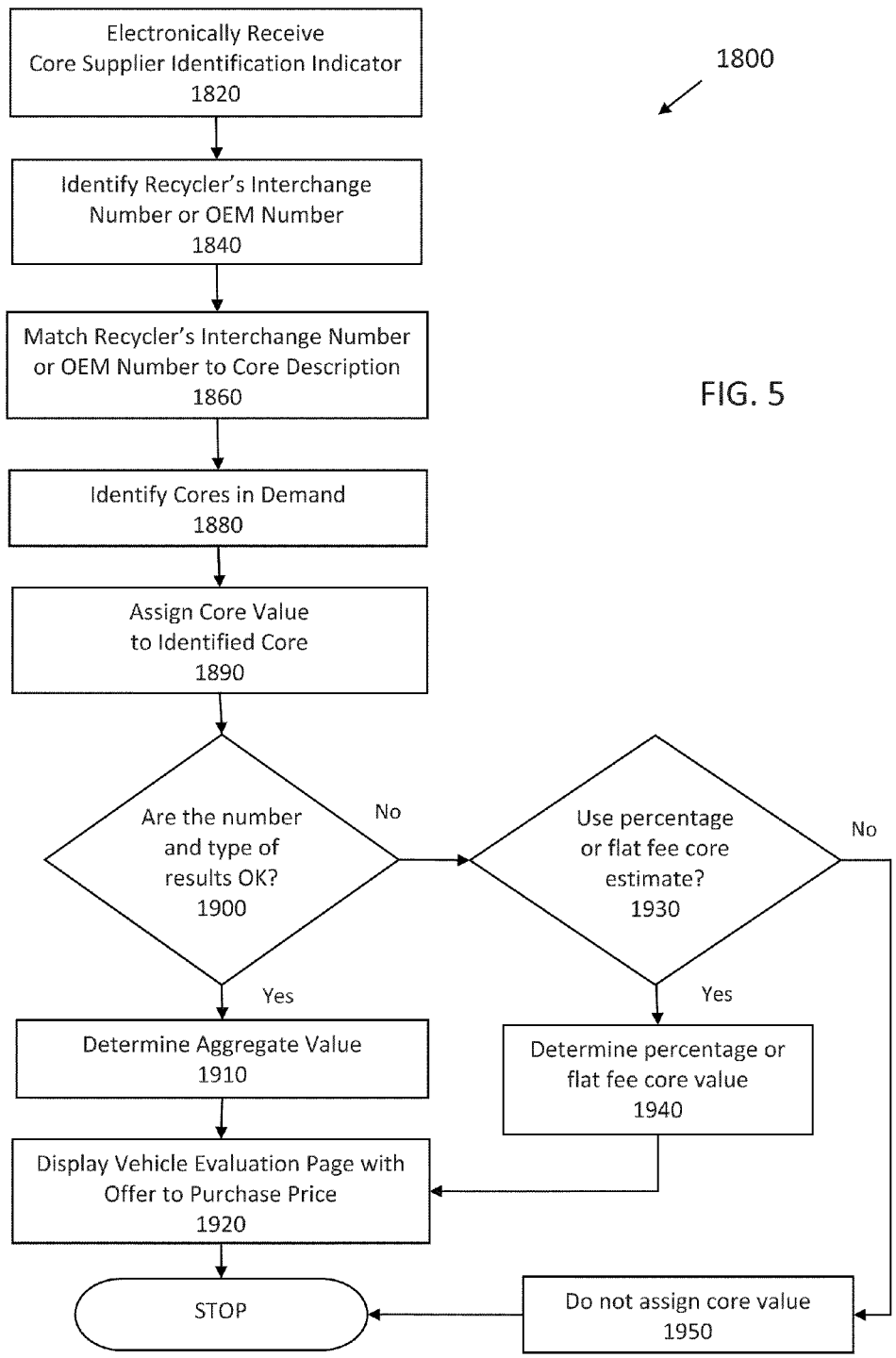
FIG. 5 is a flow diagram schematically illustrating another method of determining a vehicle value for bid at an auction based upon an aggregate core value using part identification information.

FIG. 5 is a flow diagram 1800 that schematically illustrates a method of operation in accordance with an auction house embodiment. In the case of a bottom up identification, an auction house again stands in for automotive recycler 6 and enters part type identification information or a core supplier identification indicator or an interchange number from which to base the search. The core supplier identification indicator can be an Original Equipment Manufacturer (OEM) number, a casting number, a remanufacturer-specific proprietary stock keeping unit (SKU) number, or any other notation of a core identification indicator. Similarly, the interchange number can be a Hollander number, a Lester number, and the like. In these examples, the automotive core fulfillment system 10 receives the core identification indicator as shown in block 1820 in the flow diagram of FIG. 5. As above, multiple core identification indicators may be used from which to base the search and to identify multiple higher level assemblies or multiple vehicles simultaneously. For example, a list of core identification indicators may be used, such as a manual list, a bar code or bar codes, an electronic core identification indicator or core identification indicators, or any other notation of multiple cores. With this core identification indicator information, a core inventory value may be determined based upon an aggregate total of core values of identified automotive cores. Other means of providing the core identification indicators may also be used, such as direct data feeds, RSS feeds (RDF site summary feeds or Really Simple Syndication feeds), and the like. Regardless of the manner in which the core identification indicator is provided, in block 1820 automotive core fulfillment system 10 receives the core supplier identification indicator via interface module 30.

As further shown in block 1840 of FIG. 5, once the automotive core fulfillment system 10 receives the core supplier identification indicator, the processor 20 processes the core identification indicator to determine which higher level core assemblies or automobile makes and models include the core inventory as well as a value (price) of the corresponding core. For example, processor 20 can direct a search of the OEM number database 50 and/or interchange database 40 to identify the automobile core description for the core or cores. In block 1860, the interchange number matching module 60 and the processor 20 match the automobile core description from the OEM number database 50 to the auto recycler's interchange numbers from the interchange database 40 in this auction house example.

In block 1880 of FIG. 5, interchange number matching module 60 and the processor 20 identifies those cores for the inputted core identification indicator (for example, the OEM number). In block 1890, processor 20 and the demand and pricing database 70 assigns a core value to the identified automotive core. In block 1900, the number and type of identified cores can be evaluated. If the number and type of results identified are satisfactory in block 1900, the process continues to block 1910. If, however, the number and type of results identified are not satisfactory in block 1900, the core value determination can revert to an estimated percentage of the estimated value of the vehicle, to a flat fee core value, or to another estimated core value determination apart from using the actual value of the automotive cores. For example, if a percentage or flat fee core estimate is to be used in block 1930, the percentage or flat fee is determined in block 1940, and the estimated core value can be displayed on a vehicle evaluation page with an offer to purchase price in block 1920. If, in block 1930, a percentage or flat fee core estimate is not to be used in determining an estimated core value, no core value is assigned in block 1950, and a vehicle evaluation page with an offer to purchase price can be displayed in block 1920 without a core value listed or with core values of $0.00 for cores that have no value to the remanufacturers. Of course other factors and estimate techniques can be used in block 1930 to estimate the value of the core automotive parts in the particular automobile, but these estimates do not take benefit of actual core values determined by the above methods illustrated in the examples nor do they provide a dollar amount for the particular automotive cores present in the particular automobile.

For example, when the number and type of results of the search from block 1900 are identified the process resumes at block 1910. In block 1910, processor 20 accesses demand and pricing database 70 to further identify those cores for which demand exists. The processor 20 and interface module 30 then identifies the salvage value for the particular cores identified and aggregates the cores and their respective demand and pricing information in block 1910 of FIG. 5. The system returns a vehicle evaluation page 250 that shows the part type 252, yard description 254, and core value 256 of the particular automotive core as was illustrated above in FIG. 2G. This list of vehicles, automobile cores, and their corresponding core inventory values can then be provided to the potential buyer/bidder in block 1920. The list provides value and pricing information for each of the automobile cores and vehicles. The potential buyer can use the aggregate list of core values to determine the values of the identified vehicle or vehicles being auctioned in order to determine a bid for that vehicle (or group of vehicles).

Vehicle evaluation page 250 lists automotive parts that the core supplier wishes to purchase and the offer price that the core supplier is willing to pay to an auction house or to an auction bidder for the particular part. The vehicle evaluation page 250 returns a list of parts with the part type 252 and a yard description 254 with which to identify each core. The yard description 254 may also include appropriate interchange numbers, such as Hollander numbers or Lester numbers, and the like, as well as OEM numbers and descriptions to help further determine the identity of each part. Additionally, the core supplier may also provide additional descriptive information with which to identify and confirm the parts listed. Further, the listed parts may also include additional description information requiring a cast number or an OEM number on the part in order for the part to be worth the core value listed. For example, cast descriptions may be shown in bold face type, while other information may be displayed in italics or within parentheses or in any similar manner so as to identify the notations in the yard description 254 field. The core value 256 is listed for each part offered by the core recycler. Cores that have no demand or no value to remanufacturers may be listed with a core value of $0.00 as in this example, or may be omitted from the vehicle evaluation page 250. The core values help the auction bidders, auction houses, and automotive dismantlers determine if it is cost-effective to remove particular cores from the vehicle. Of course, vehicle evaluation page 250 may display different interchange numbers, be arranged differently, and provide additional information in other implementations of the claimed invention, as well.

In this fashion, the returned list of automobile cores and their corresponding core values provides a purchase order from the ultimate buyer (core supplier) to the bidder. The purchase order can indicate the core inventory, quantity, and price for the cores that the bidder may provide to the automotive recycler. The purchase offer can constitute a legal offer to buy the core inventory. As above, the auction bidder receives core pricing information to use in formulating his bid strategy and can participate in the supply chain in an informed fashion by knowing, prior to acquisition, the value of the automotive cores present in the vehicle up for auction. As described above, after acquiring the car, the auction bidder can then participate in dismantling the car or provide the vehicle and/or cores to an automotive recycler to dismantle or otherwise provide the automotive cores to the core supplier as described above.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

The claimed invention is:

1. A computer-implemented method of identifying an automotive core in a vehicle up for bidding for an auction house and determining the value of the automotive core using a computer processor in a core fulfillment system, the method comprising:

receiving vehicle identification information from the auction house at an interface computing device, wherein the vehicle identification information characterizes the vehicle up for bidding;

comparing, with the computer processor, the vehicle identification information from the auction house at the interface computing device to automotive core descriptions and automotive interchange numbers in an interchange database and core supplier identification indicators in a core supplier database;

identifying the automotive core with an interchange number matching computing device based upon the comparison of the vehicle identification information to automotive core descriptions and automotive interchange numbers and core supplier identification indicators, the automotive core descriptions including a part type identifier and a yard description;

assigning, with a demand and pricing database, a core monetary value to the identified automotive core;

determining, with the demand and pricing database, an aggregate value of core inventory based upon an aggregate total of assigned core values of identified automotive cores, wherein the aggregate total may not be the same as a sum of all identified automotive cores; and sending a vehicle evaluation page to an auction bidder, the vehicle evaluation page showing the identified automotive core, yard description, and the aggregate value of core inventory, the aggregate value of core inventory indicating an offer for purchase price that a core supplier will pay to the auction bidder for the automotive cores based upon the demand for the automotive cores.

2. The method of claim 1 further comprising:
displaying the vehicle evaluation page to the auction bidder prior to bidding on the vehicle.

3. The method of claim 1, wherein the vehicle identification information includes the year the vehicle was manufactured, the make of the vehicle, and the model of the vehicle.

4. The method of claim 3 further comprising:
receiving, from the auction house, in the interface computing device, at least one of engine displacement volume, number of cylinders, transmission type, number of doors, identification number, and brake type to supplement the vehicle identification information; and comparing, with the interchange number matching computing device, the at least one of engine displacement volume, number of cylinders, transmission type, number of doors, identification number, and brake type to automotive core descriptions and automotive interchange numbers and core supplier identification indicators that correspond to the vehicle identification information to further identify the automotive core.

5. The method of claim 1, wherein the vehicle identification information includes a list of vehicle identifiers to process multiple vehicles simultaneously.

6. The method of claim 5, wherein the list of vehicle identifiers includes at least one of an electronic VIN number or a bar code with which to process multiple vehicles simultaneously.

7. The computer-implemented method of claim 1 further comprising:
sending, to the auction bidder, an indication from an automotive recycler indicating the identified automotive core to be bid on, removed, and sold to a core supplier at the offered purchase price; and sending to the auction bidder a vehicle summary page listing automotive cores the automotive recycler has chosen for removal and sale and a total aggregate core value of offered purchase prices.

8. The computer-implemented method of claim 7 further comprising:
sending a dismantler report to ensure appropriate automotive cores are removed by the automotive recycler;
sending core part tags to attach to each removed core as a vehicle is dismantled;
receiving a bin inventory from the automotive recycler indicating the removed core was added to in-process inventory to be sold to the core supplier;
confirming the bin inventory from the automotive recycler; and
generating an invoice of the automotive cores in the bin inventory to accompany the automotive cores sold to the core supplier.

9. A computer-implemented method of identifying an automotive core in a vehicle up for bidding for an auction house and determining the value of the automotive core using a computer processor in a core fulfillment system, the method comprising:
receiving part type identification information from the auction house at an interface computing device, wherein the part type identification information characterizes the automotive core in the vehicle up for bidding;
receiving an automotive interchange number from the auction house at the interface computing device;
comparing, with the computer processor, the part type identification information from the auction house at the interface computing device to automotive core descriptions and core supplier identification indicators in a core supplier database that correspond to vehicle identification information and the automotive interchange numbers in an interchange database;
identifying the automotive core with an interchange number matching computing device based upon the comparison of the part type identification information and automotive interchange number to automotive core descriptions and core supplier identification indicators, the automotive core descriptions including a part type identifier and a yard description;
assigning, with a demand and pricing database, a core monetary value to the identified automotive core;
determining, with the demand and pricing database, an aggregate value of core inventory based upon an aggregate total of assigned core values of identified automotive cores, wherein the aggregate total may not be the same as a sum of all identified automobile cores; and
sending a vehicle evaluation page to an auction bidder showing the identified automotive core, yard description, and the aggregate value of core inventory, the aggregate value of core inventory indicating an offer for purchase price that a core supplier will pay to the auction bidder for the automotive cores based upon the demand for the automotive cores.

10. The method of claim 9 further comprising:
displaying the vehicle evaluation page to the auction bidder prior to bidding on the vehicle.

11. The method of claim 9 further comprising:
receiving, from the auction house, in the interface computing device, at least one of engine displacement volume, number of cylinders, transmission type, number of doors, identification number, and brake type to supplement the part type identification information; and
comparing, with the interchange number matching computing device, the at least one of engine displacement volume, number of cylinders, transmission type, number of doors, identification number, and brake type to automotive core descriptions and automotive interchange numbers and core supplier identification indicators that correspond to vehicle identification information to further identify the automotive core.

12. The method of claim 9, wherein the part type identification information includes a list of part type identifiers to process multiple parts simultaneously.

13. The method of claim 12, wherein the list of part type identifiers includes at least one of an electronic part number or a bar code with which to process multiple parts simultaneously.

14. The computer-implemented method of claim 9 further comprising:
sending, to the auction bidder, an indication from an automotive recycler indicating the identified automotive core to be removed and sold to a core supplier at the offered purchase price; and
sending, to the auction bidder, a vehicle summary page listing automotive cores the automotive recycler has chosen for removal and sale and a total aggregate core value of offered purchase prices.

15. The computer-implemented method of claim 14 further comprising:
sending a dismantler report to ensure appropriate automotive cores are removed by the automotive recycler;
sending core part tags to attach to each removed core as a vehicle is dismantled;
receiving a bin inventory from the automotive recycler indicating the removed core was added to in-process inventory to be sold to the core supplier;
confirming the bin inventory from the automotive recycler; and
generating an invoice of the automotive cores in the bin inventory to accompany the automotive cores sold to the core supplier.

16. A computer readable storage media for identifying an automotive core in a vehicle up for bidding for an auction house and determining the value of the automotive core using a core fulfillment system, the computer readable storage media comprising one or more computer-readable instructions configured to cause one or more computer processors to execute operations comprising:
receiving vehicle identification information from the auction house at an interface computing device, wherein the vehicle identification information characterizes the vehicle up for bidding;
comparing the vehicle identification information from the auction house at the interface computing device to automotive core descriptions and automotive interchange numbers in an interchange database and core supplier identification indicators in a core supplier database;
identifying the automotive core with an interchange number matching computing device-based upon the comparison of the vehicle identification information to automotive core descriptions and automotive interchange numbers and core supplier identification indicators, the automotive core descriptions including a part type identifier and a yard description;
assigning, with a demand and pricing database, a core monetary value to the identified automotive core;
determining, with the demand and pricing database, an aggregate value of core inventory based upon an aggregate total of assigned core values of identified automotive cores, wherein the aggregate total may not be the same as a sum of all identified automotive cores; and sending a vehicle evaluation page to an auction bidder, the vehicle evaluation page showing the identified automotive core, yard description, and the aggregate value of core inventory, the aggregate value of core inventory indicating an offer for purchase price that a core supplier will pay to the auction bidder for the automotive cores based upon the demand for the automotive cores.

17. The computer readable storage media of claim 16 further comprising:
displaying the vehicle evaluation page to the auction bidder prior to bidding on the vehicle.

18. The computer readable storage media of claim 16, wherein the vehicle identification information includes the year the vehicle was manufactured, the make of the vehicle, and the model of the vehicle.

19. The computer readable storage media of claim 18 further comprising computer-readable instructions configured to cause one or more computer processors to execute the operations comprising:
receiving, from the auction house, in the interface computing device, at least one of engine displacement volume, number of cylinders, transmission type, number of doors, identification number, and brake type to supplement the vehicle identification information; and
comparing, with the interchange number matching computing device, the at least one of engine displacement volume, number of cylinders, transmission type, number of doors, identification number, and brake type to automotive core descriptions and automotive interchange numbers and core supplier identification indicators that correspond to the vehicle identification information to further identify the automotive core.

20. The computer readable storage media of claim 16, wherein the vehicle identification information includes a list of vehicle identifiers to process multiple vehicles simultaneously.

21. The computer readable storage media of claim 20, wherein the list of vehicle identifiers includes at least one of an electronic VIN number or a bar code with which to process multiple vehicles simultaneously.

22. The computer readable storage media of claim 16 further comprising computer-readable instructions configured to cause one or more computer processors to execute the operations comprising:
sending, to the auction bidder, an indication from an automotive recycler indicating the identified automotive core to be bid on, removed, and sold to a core supplier at the offered purchase price; and
sending, to the auction bidder, a vehicle summary page listing automotive cores the automotive recycler has chosen for removal and sale and a total aggregate core value of offered purchase prices.

23. The computer readable storage media of claim 22 further comprising computer-readable instructions configured to cause one or more computer processors to execute the operations comprising:
sending a dismantler report to ensure appropriate cores are removed by the automotive recycler;
sending core part tags to attach to each removed core as a vehicle is dismantled;
receiving a bin inventory from the automotive recycler indicating the removed core was added to in-process inventory to be sold to the core supplier;
confirming the bin inventory from the automotive recycler; and
generating an invoice of the automotive cores in the bin inventory to accompany the automotive cores sold to the core supplier.

24. A computer readable storage media for identifying an automotive core in a vehicle up for bidding for an auction house and determining the value of the automotive core using a core fulfillment system, the computer readable storage media comprising one or more computer-readable instructions configured to cause one or more computer processors to execute operations comprising:
receiving part type identification information from the auction house at an interface computing device, wherein the part type identification information characterizes an automotive core in the vehicle up for bidding;
receiving an automotive interchange number from the auction house at the interface computing device;
comparing the part type identification information from the auction house at the interface computing device to automotive core descriptions and core supplier identification indicators in a core supplier database that correspond to vehicle identification information and the automotive interchange numbers in an interchange database;
identifying the automotive core with an interchange number matching computing device based upon the comparison of the part type identification information and automotive interchange number to automotive core descriptions and core supplier identification indicators, the automotive core descriptions including a part type identifier, and a yard description;
assigning, with a demand and pricing database, a core monetary value to the identified automotive core;
determining, with the demand and pricing database, an aggregate value of core inventory based upon an aggregate total of assigned core values of identified automotive cores, wherein the aggregate total may not be the same as a sum of all identified automotive cores; and
sending a vehicle evaluation page to the auction bidder showing the identified automotive core, yard description, and the aggregate value of core inventory, the aggregate value of core inventory indicating an offer for purchase price that a core supplier will pay to the auction bidder for the automotive cores based upon the demand for the automotive cores.

25. The computer readable storage media of claim 24 further comprising:
displaying the vehicle evaluation page to the auction bidder prior to bidding on the vehicle.

26. The computer readable storage media of claim 24 further comprising computer-readable instructions configured to cause one or more computer processors to execute the operations comprising:
receiving, from the auction house, in the interface computing device, at least one of engine displacement volume, number of cylinders, transmission type, number of doors, identification number, and brake type to supplement the part type identification information; and
comparing, with the interchange number matching computing device, the at least one of engine displacement volume, number of cylinders, transmission type, number of doors, identification number, and brake type to automotive core descriptions and automotive interchange numbers and core supplier identification indicators that correspond to vehicle identification information to further identify the automotive core.

27. The computer readable storage media of claim 24, wherein the part type identification information includes a list of part type identifiers to process multiple parts simultaneously.

28. The computer readable storage media of claim 27, wherein the list of part type identifiers includes at least one of an electronic part number or a bar code with which to process multiple parts simultaneously.

29. The computer readable storage media of claim 24 further comprising computer-readable instructions configured to cause one or more computer processors to execute the operations comprising:

sending, to the auction bidder, an indication from an automotive recycler indicating the identified automotive core to be removed and sold to a core supplier at the offered purchase price; and sending, to the auction bidder, a vehicle summary page listing cores the automotive recycler has chosen for removal and sale and a total core value of offered purchase prices.

30. The computer readable storage media of claim 29 further comprising computer-readable instructions configured to cause one or more computer processors to execute the operations comprising:

sending a dismantler report to ensure appropriate cores are removed by the automotive recycler;

sending core part tags to attach to each removed core as a vehicle is dismantled;

receiving a bin inventory from the automotive recycler indicating the removed core was added to in-process inventory to be sold to the core supplier;

confirming the bin inventory from the automotive recycler; and generating an invoice of the automotive cores in the bin inventory to accompany the automotive cores sold to the core supplier.

* * * * *